US008842985B2

(12) United States Patent
Hino et al.

(10) Patent No.: US 8,842,985 B2
(45) Date of Patent: Sep. 23, 2014

(54) OPTICAL DATA TRANSMISSION DEVICE, OPTICAL COMMUNICATION DEVICE, AND AUTOMATIC CONVEYANCE DEVICE

(75) Inventors: Masanori Hino, Osaka (JP); Yoji Maejima, Otsu (JP)

(73) Assignee: Hokuyo Automatic Co., Ltd

( * ) Notice: Subject to any disclaimer, the term of this patent is extended or adjusted under 35 U.S.C. 154(b) by 59 days.

(21) Appl. No.: 13/806,028

(22) PCT Filed: Jun. 29, 2011

(86) PCT No.: PCT/JP2011/064907
§ 371 (c)(1),
(2), (4) Date: Dec. 20, 2012

(87) PCT Pub. No.: WO2012/002431
PCT Pub. Date: Jan. 5, 2012

(65) Prior Publication Data
US 2013/0156419 A1 Jun. 20, 2013

(30) Foreign Application Priority Data

Jul. 1, 2010 (JP) ................................ 2010-150985

(51) Int. Cl.
| H04B 17/00 | (2006.01) |
| H04B 10/00 | (2013.01) |
| B66F 9/24 | (2006.01) |
| H04B 10/516 | (2013.01) |
| H04B 10/112 | (2013.01) |
| B66F 9/07 | (2006.01) |

(52) U.S. Cl.
CPC ............... *H04B 10/516* (2013.01); *B66F 9/24* (2013.01); *H04B 10/1127* (2013.01); *B66F 9/07* (2013.01)
USPC .............. 398/25; 398/135; 398/136; 398/138

(58) Field of Classification Search
USPC ...................... 398/25–27, 135, 136, 138, 164
See application file for complete search history.

(56) References Cited

U.S. PATENT DOCUMENTS

| 7,480,462 B2 * | 1/2009 | Ternullo et al. ............... 398/135 |
| 8,649,678 B2 * | 2/2014 | Hoshida et al. ................ 398/27 |
| 2010/0158530 A1 * | 6/2010 | Soto et al. ....................... 398/79 |
| 2011/0004802 A1 * | 1/2011 | Bialkowski et al. .......... 714/752 |

(Continued)

FOREIGN PATENT DOCUMENTS

| JP | 6-54382 U | 7/1994 |
| JP | 10-197583 | 7/1998 |

(Continued)

OTHER PUBLICATIONS

International Search Report for PCT/JP2011/064907.

*Primary Examiner* — Dalzid Singh
(74) *Attorney, Agent, or Firm* — Pillsbury Winthrop Shaw Pittman, LLP

(57) ABSTRACT

Reliable data transmission is secured without inviting large design changes by means of configuring an optical data transmission device in a manner so as to be provided with: data conversion units and optical communication control units that transmit to each of a first communication unit and a second communication unit disposed movably relative to one another an optical signal modulated in response to wired-line data input from a wired line, and that output wired-line data demodulated from the received optical signal to the wired line; a bit data input unit that receives input of bit data for emergency stops; a bit data output unit that outputs bit data for emergency stops; and bit data communication control units that control in a manner so as to transmit/receive input bit data via the optical communication control units using optical signals that are isolated from the optical signal corresponding to the wired-line data.

15 Claims, 15 Drawing Sheets

(56) References Cited

U.S. PATENT DOCUMENTS

2011/0013911 A1* 1/2011 Alexander et al. ............ 398/79
2013/0136446 A1* 5/2013 Hotchkiss et al. ............ 398/22

FOREIGN PATENT DOCUMENTS

| JP | 2001-285394 | 10/2001 |
| JP | 2002-114487 | 4/2002 |
| JP | 2004-067306 | 3/2004 |
| JP | 2007-096426 | 4/2007 |
| JP | 2007-305159 | 11/2007 |
| JP | 2009-194623 | 8/2009 |

* cited by examiner

| ADDRESS | MODULATION TABLE |
|---|---|
| 0 | 30° / 0.5 |
| 1 | 90° / 1 |
| 2 | 150° / 0.5 |
| 3 | 210° / -0.5 |
| 4 | 270° / -1 |
| 5 | 330° / -0.5 |

| SAMPLING DATA m | Sin2πm/6 | Cos2πm/6 | Sin SIMPLE VALUE | Cos SIMPLE VALUE |
|---|---|---|---|---|
| 0 | 0 | 1 | 0 | ×8 |
| 1 | 0.866 | 0.5 | ×8 | ×4 |
| 2 | 0.866 | −0.5 | ×8 | ×(−4) |
| 3 | 0 | −1 | 0 | ×(−8) |
| 4 | −0.866 | −0.5 | ×(−8) | ×(−4) |
| 5 | −0.866 | 0.5866 | ×(−8) | ×8 |

| COMMUNICATION STATUS | CONTENT | STATUS CODE |
|---|---|---|
| NORMAL | NORMALLY TRANSMITTED/RECEIVED | F0h |
| TIME-OUT ERROR | UNRECEIVABLE WITHIN RECEPTION ALLOWABLE TIME | E1h |
| RECEPTION ERROR | RECEPTION ERROR IS GENERATED | D2h |
| RETRANSMISSION PROCESS | RETRANSMISSION FOR RECEPTION ERROR ON THE OPPOSITE SIDE | B4h |
| INPUT CIRCUIT FAILURE | FAILURE DETECTION OF INPUT CIRCUIT IN SELF-DIAGNOSIS | A5h |
| OUTPUT CIRCUIT FAILURE | FAILURE DETECTION OF OUTPUT CIRCUIT IN SELF-DIAGNOSIS | 96h |

Fig.10

OPTICAL DATA TRANSMISSION DEVICE, OPTICAL COMMUNICATION DEVICE, AND AUTOMATIC CONVEYANCE DEVICE

CROSS-REFERENCE TO RELATED APPLICATIONS

This is the U.S. National Stage of PCT/JP2011/064907, filed Jun. 29, 2011, which in turn claims priority to Japanese Patent Application No. 2010-150985, filed Jul. 1, 2010, the entire contents of both applications are incorporated herein by reference in their entireties.

TECHNICAL FIELD

The present invention relates to an optical data transmission device, an optical communication device constituting the optical data transmission device, and an automatic conveyance device in which the optical data transmission device is used, and particularly relates to an optical data transmission device and an optical communication device which are suitable for data transmission between fixed equipment and mobile equipment.

BACKGROUND ART

In mobile equipment traveling along a track of a stacker crane, an overhead traveling crane and the like used for conveying goods and the like, signals such as control instructions are transferred between a system control device and a control device on the mobile equipment side through an optical data transmission device for the purpose of wire-saving and the like.

Patent Document 1 discloses an automatic conveyance device in which a system control device which is fixed equipment and a crane control device mounted to a stacker crane which is mobile equipment are connected to each other through wired lines between which an optical data transmission device is interposed.

In the automatic conveyance device, control instructions which are output from the system control device to the wired line are transmitted to the wired line connected to the crane control device side through the optical data transmission device.

Such an automatic conveyance device is provided with a normal stop function for interrupting automatic control using the system control device for the purpose of maintenance and the like to temporarily stop moving devices, or an emergency stop function for previously preventing the occurrence of a serious and dangerous situation such as a collision with mobile equipment caused by intrusion of persons or obstacles into a traveling path, device failures or the like. Particularly, the emergency stop function requires an extremely high level of safety so as to reliably operate when needed.

For example, safety systems are widely known in which when a sensor such as a photoelectric SW that detects intruders or obstacles is installed on mobile equipment and the intruders or obstacles within the traveling path are detected by the sensor, the mobile equipment is caused to be immediately stopped.

Patent Document 1 discloses a control method for avoiding an accidental contact of two stacker cranes moving on the same track, in which two stacker cranes which are supported by wheels disposed in the forward-rearward direction of movement and move on the same track are provided with position detection means for detecting a position on the track and an optical transmitter for transmitting position information detected by the position detection means to the other stacker crane and receiving the position information transmitted from the other stacker crane, and each of the stacker cranes is brought to an emergency stop when the proximity to the other stacker crane is recognized based on the other position information received by the optical transmitter and its own position information. Meanwhile, as the position detection means, a rotary encoder that detects the rotation of the wheels, a distance measuring device that detects the distance from a reference position, or the like is used.

Patent Document 2 discloses an emergency stop device capable of bringing a mobile crane to an emergency stop in accordance with the intention of an operator. The emergency stop device is configured such that an emergency stop switch, for stopping an engine or the like in an emergency, is connected in series through a connector between control means such as an engine of a mobile crane or a solenoid and a power source. The emergency stop switch is connected to a connector through a certain length of wiring so as to be portably carried inside and outside a machine body spaced apart from the machine body.

PRIOR ART DOCUMENTS

Patent Documents

[Patent Document 1] JP 2007-305159 A
[Patent Document 2] JP 2002-114487 A

SUMMARY OF INVENTION

Problems to be Solved by the Invention

When an emergency stop switch is installed on the fixed equipment side, and mobile equipment is brought to an emergency stop in the case where the emergency stop switch is operated in accordance with the intention of an operator, as disclosed in Patent Document 2, a configuration in which a power feed path to the mobile equipment is cut off by an operation of the emergency stop switch allows the mobile equipment to be stopped rapidly.

Generally, since the mobile equipment is provided with a power collector that collects power in contact with a power feed line arranged along the track on which the mobile equipment travels, this can be realized by opening a switch such as a power feed relay that connects the power source to the power feed line through an operation of the emergency stop switch.

However, when control information such as position data stored in a storage unit of a control device included in the mobile equipment is lost by stopping a supply of power to the control device, and then a return to a normal control state is performed, there is an inconvenience that a complicated initial setting procedure of a movement of the mobile equipment to an initial position and a long period of return time are required. In addition, in such a system where a control program stored in the storage unit is even lost by stopping the supply of power, a longer period of time is required due to a rewriting process of the control program, or the like, at the time of the return.

Meanwhile, in order to cope with an instantaneous power failure of a power source, in a system including a battery in the mobile equipment, even when the power feed relay that connects the power source to the power feed line is opened by the operation of the emergency stop switch, it takes a time for the battery to discharge, and thus there is a problem in that the mobile equipment cannot be immediately stopped.

Consequently, a following structure is considered: without interrupting the power source, operation information of the emergency stop switch installed on the fixed equipment is transmitted from the fixed equipment to the mobile equipment through the optical data transmission device, and the control device of the mobile equipment receiving the operation information is brought to an emergency stop.

However, existing optical data transmission devices that connect the fixed equipment to the mobile equipment are used to perform a relay so as to transmit control data, which is output from the system control device to the wired line, to the wired line connected to the control device of the mobile equipment, and are not likely to fetch, into control data, operation information of the emergency stop switch generated in other than a signal transmission path between the system control device which is the fixed equipment and the control device of the mobile equipment. Therefore, in order to address this problem, very extensive design changes are required including the system control device.

In addition, since existing optical data transmission devices do not correspond to the functional safety standard (IEC61508) required for such a signal having a high degree of importance as an emergency stop switch signal, there is a problem in that existing optical data transmission devices do not satisfy reliability required for the functional safety standard from the view point of a failure rate or an error rate. For this reason, there is also a problem in that the separate provision of an optical data transmission device having high reliability causes an increase in cost.

The present invention is contrived in view of such circumstances, and an object thereof is to provide an optical data transmission device, an optical communication device, and an automatic conveyance device which are capable of securing the reliability of information transmission, without causing large design changes, while adopting basic configurations of existing optical data transmission devices.

Means for Solving the Problems

In order to achieve the above-mentioned object, according to a first feature configuration of the present invention as set forth in claim 1, there is provided an optical data transmission device including a first communication unit and a second communication unit which are disposed movably relative to each other, wherein the first communication unit includes a first data conversion unit that converts wired-line data which is input from a wired line into wired-line frame data for optical communication to output the converted frame data to a first optical communication control unit, and inversely converts the wired-line frame data which is input from the first optical communication control unit into wired-line data to output the inversely-converted data to the wired line, the first optical communication control unit that transmits an optical signal, optically modulated based on the wired-line frame data which is input from the first data conversion unit, toward the second communication unit, and demodulates the wired-line frame data from an optical signal transmitted from the second communication unit to output the demodulated frame data to the first data conversion unit, a bit data input unit including an input circuit that inputs bit data from a signal line different from the wired line, and a first bit data communication control unit that generates predetermined bit frame data including bit data which is input to the bit data input unit to output the generated bit frame data to the first optical communication control unit, and causes the first optical communication control unit to transmit an optical signal, optically modulated based on the bit frame data, toward the second communication unit at a predetermined interval, and the second communication unit includes a second data conversion unit that converts wired-line data which is input from a wired line into the wired-line frame data to output the converted frame data to a second optical communication control unit, and inversely converts the wired-line frame data which is input from the second optical communication control unit into wired-line data to output the inversely-converted data to the wired line, the second optical communication control unit that transmits an optical signal, optically modulated based on the wired-line frame data which is input from the second data conversion unit, toward the first communication unit, and demodulates the wired-line frame data from an optical signal transmitted from the first communication unit to output the demodulated frame data to the second data conversion unit, a second bit data communication control unit that causes the second optical communication control unit to demodulate the bit frame data from an optical signal transmitted from the first communication unit, and a bit data output unit including an output circuit that outputs bit data contained in the bit frame data demodulated in the second optical communication control unit from a signal line different from the wired line.

According to the above-mentioned optical data transmission device, first of all, the wired-line data which is input from the wired line connected to the first communication unit is relayed as an optical signal modulated by the wired-line frame data corresponding to the wired-line data by the first data conversion unit and the first optical communication control unit included in the first communication unit, and the second data conversion unit and the second optical communication control unit included in the second communication unit, and a communication path is established for transmission to the wired line connected to the second communication unit.

Further, predetermined bit frame data including the bit data which is input to the bit data input unit is generated by the first bit data communication control unit included in the first communication unit, the bit frame data is transmitted toward the second communication unit at a predetermined interval through the first optical communication control unit, and the bit data is extracted from the bit frame data, received through the second optical communication control unit, by the second bit data communication control unit included in the second communication unit and is output from the bit data output unit.

That is, according to the optical data transmission device including the first feature configuration, it is possible to perform communication of the wired-line data and communication of the bit data by sharing one optical communication path, without causing a change in a process of generating existing wired-line data.

According to a second feature configuration as set forth in claim 2, there is provided an optical data transmission device including a first communication unit and a second communication unit which are disposed movably relative to each other, wherein the first communication unit includes a first data conversion unit that converts wired-line data which is input from a wired line into wired-line frame data for optical communication to output the converted frame data to a first optical communication control unit, and inversely converts the wired-line frame data which is input from the first optical communication control unit into wired-line data to output the inversely-converted data to the wired line, the first optical communication control unit that transmits an optical signal, optically modulated based on the wired-line frame data which is input from the first data conversion unit, toward the second communication unit, and demodulates the wired-line frame data from an optical signal transmitted from the second communication unit to output the demodulated frame data to the first data conversion unit, a bit data input unit including an input circuit that inputs bit data from a signal line different from the wired line and a diagnostic circuit that diagnoses whether the input circuit of the bit data input unit is normally operated, and a first bit data communication control unit that controls the diagnostic circuit to diagnose the input circuit, generates, when it is determined that the input circuit is abnormal, bit frame data, including bit data input to the bit data input unit, into which a status code indicating the abnormal state is incorporated to output the generated bit frame data to the first optical communication control unit, and causes the first optical communication control unit to transmit an optical signal, optically modulated based on the bit frame data, toward the second communication unit, and the second communication unit includes a second data conversion unit that converts wired-line data which is input from a wired line into the wired-line frame data to output the converted frame data to a second optical communication control unit, and inversely converts the wired-line frame data which is input from the second optical communication control unit into wired-line data to output the inversely-converted data to the wired line, the second optical communication control unit that transmits an optical signal, optically modulated based on the wired-line frame data which is input from the second data conversion unit, toward the first communication unit, and demodulates the wired-line frame data from an optical signal transmitted from the first communication unit to output the demodulated frame data to the second data conversion unit, a second bit data communication control unit that causes the second optical communication control unit to demodulate the bit frame data from an optical signal transmitted from the first communication unit, and a bit data output unit including an output circuit that outputs bit data contained in the bit frame data demodulated in the second optical communication control unit from a signal line different from the wired line.

In addition to the above-mentioned first feature configuration, the diagnostic circuit provided in the bit data input unit is controlled by the first bit data communication control unit, and an operation state of the input circuit is diagnosed based on a result. When the input circuit is diagnosed to be abnormal by the first bit data communication control unit, bit frame data, including bit data, into which a status code indicating an abnormal state is incorporated is generated, and an optical signal modulated based on the bit frame data is output through the first optical communication control unit.

The second bit data communication control unit receiving the bit frame data through the second optical communication control unit detects abnormality of the input circuit based on the status code indicating the abnormal state which is added to the bit frame data, and can evaluate the reliability of bit data. For example, when the status code indicating the abnormal state is detected, in order to prevent a situation in which erroneous bit data is output from being generated, the second bit data communication control unit can maintain an output state of the bit data which is output from the bit data output unit, or can be forcibly switched. For example, it is possible to realize a fail-safe by switching bit data to default data in which a system where the optical data transmission device is incorporated is not abnormally operated before sending out.

In a third feature configuration as set forth in claim 3, in addition to the second feature configuration, the input circuit and the diagnostic circuit are redundantly installed, the first bit data communication control unit that controls the diagnostic circuit to diagnose the input circuit is redundantly installed, the first bit data communication control units are connected to each other through a communication line, at least one of the first bit data communication control units controls each diagnostic circuit to diagnose each input circuit, another first bit data communication control unit is also configured to diagnose each input circuit at the same time, and at least one of the first bit data communication control units outputs the bit frame data, into which a status code indicating a normal state is incorporated, to the first optical communication control unit when all the diagnosis results are determined to be normal.

Each diagnostic circuit redundantly installed is controlled by one of the first bit data communication control units redundantly installed, and the state of the input circuit at that time is diagnosed by each of the first bit data communication control units. The diagnosis result in each of the first bit data communication control units is checked through the communication line, and the input circuit is determined to be normal when all the diagnosis results are determined to be normal. As a result, it is possible to secure a high level of reliability of the bit data which is input through the input circuit.

In a fourth feature configuration as set forth in claim 4, in addition to either one of the first to third feature configurations, the first bit data communication control unit causes the first optical communication control unit to transmit an optical signal optically modulated based on the bit frame data toward the second communication unit, at the time of non-transmission of an optical signal based on the wired-line frame data.

When communication of the wired-line data and communication of the bit data are performed by sharing one optical communication path, the transmission of an optical signal optically modulated based on the bit frame data at the time of non-transmission of an optical signal based on the wired-line frame data allows communication of the bit data to be performed without interfering with communication of the wired-line data. That is, it is possible to generate an optical signal based on the bit frame data without causing a change in a process of generating an optical signal based on the wired-line frame data, and to independently secure the reliability of communication of the bit data.

In a fifth feature configuration as set forth in claim 5, in addition to either one of the first to fourth feature configurations, both the first bit data communication control unit and the second bit data communication control unit include an identification code setting unit that sets a predetermined identification code, the first bit data communication control unit outputs the bit frame data into which an identification code set in the identification code setting unit is incorporated to the first optical communication control unit, and the second bit data communication control unit compares an identification code contained in the bit frame data received in the second optical communication control unit with an identification code set in the identification code setting unit, and determines that the bit frame data is effective when both the identification codes have a predetermined relationship.

Even when there is a possibility of erroneous bit frame data being obtained by receiving an optical signal from another communication unit in the case where the first communication unit and the second communication unit are moved relative to each other, it is possible to determine the effectiveness of the bit frame data based on the identification code added to the bit frame data. For example, when the identification code added to the bit frame data by the first bit data communication control unit and the identification code which is set in the second bit data communication control unit are consistent with each other, it is possible to determine that the bit frame data is effective. In this case, determination reference data of the effectiveness may be set in a memory or a register of each bit data communication control unit in advance, and in the above-mentioned example, determination reference data indicating the effectiveness may be set when both the identification codes are consistent with each other.

In a sixth feature configuration as set forth in claim 6, in addition to either one of the first to fifth feature configurations, predetermined default data is set so as to be output from the bit data output unit until communication of the bit frame data between the first bit data communication control unit and the second bit data communication control unit is established after a supply of power to the device.

Since the bit frame data is transmitted from the first communication unit to the second communication unit, using a transmission request transmitted from the second communication unit including the bit data output unit to the first communication unit including the bit data input unit as a trigger, the second communication unit can determine whether an operation state of the first communication unit is normal based on the presence or absence of a response from the first communication unit with respect to the transmission request, and can increase safety by outputting predetermined default data from the bit data output unit until there is a response from the first communication unit. For example, even when the abnormality of communication or the like occurs, it is possible to realize a fail-safe by the setting to default data in which the system where the optical data transmission device is incorporated is not abnormally operated.

According to another first feature configuration of the present invention as set forth in claim 7, there is provided the optical communication device which is incorporated into the optical data transmission device including either one of the above-mentioned first to sixth feature configurations, the optical communication device including: the first data conversion unit, the first optical communication control unit, the bit data input unit, and the first bit data communication control unit.

According to another second feature configuration of the present invention as set forth in claim 8, there is provided the optical communication device which is incorporated into the optical data transmission device including either one of the above-mentioned first to sixth feature configurations, the optical communication device including: the second data conversion unit, the second optical communication control unit, the bit data output unit, and the second bit data communication control unit.

According to another first feature configuration of the present invention as set forth in claim 9, there is provided the automatic conveyance device including mobile equipment that moves on a predetermined track and fixed equipment that controls the mobile equipment, wherein communication between the mobile equipment and the fixed equipment is performed through the optical data transmission device including either one of the above-mentioned first to sixth feature configurations.

In the second feature configuration of the automatic conveyance device of the present invention as set forth in claim 10, in addition to the above-mentioned first feature configuration, bit data indicating an operation state of an emergency stop switch is input to the bit data input unit, and transitions to a predetermined safety state based on an emergency stop signal which is output from the bit data output unit.

Effects of Invention

As described above, according to the present invention, it is possible to provide an optical data transmission device, an optical communication device, and an automatic conveyance device which are capable of securing the reliability of information transmission, without causing large design changes, while adopting basic configurations of existing optical data transmission devices.

BRIEF DESCRIPTION OF DRAWINGS

FIG. 10 is a diagram illustrating a communication status of the bit frame data.

EMBODIMENTS FOR CARRYING OUT THE INVENTION

Hereinafter, an example will be described in which an optical data transmission device according to the present invention is applied to an automatic conveyance device installed in a general distribution warehouse.

Figure 1:
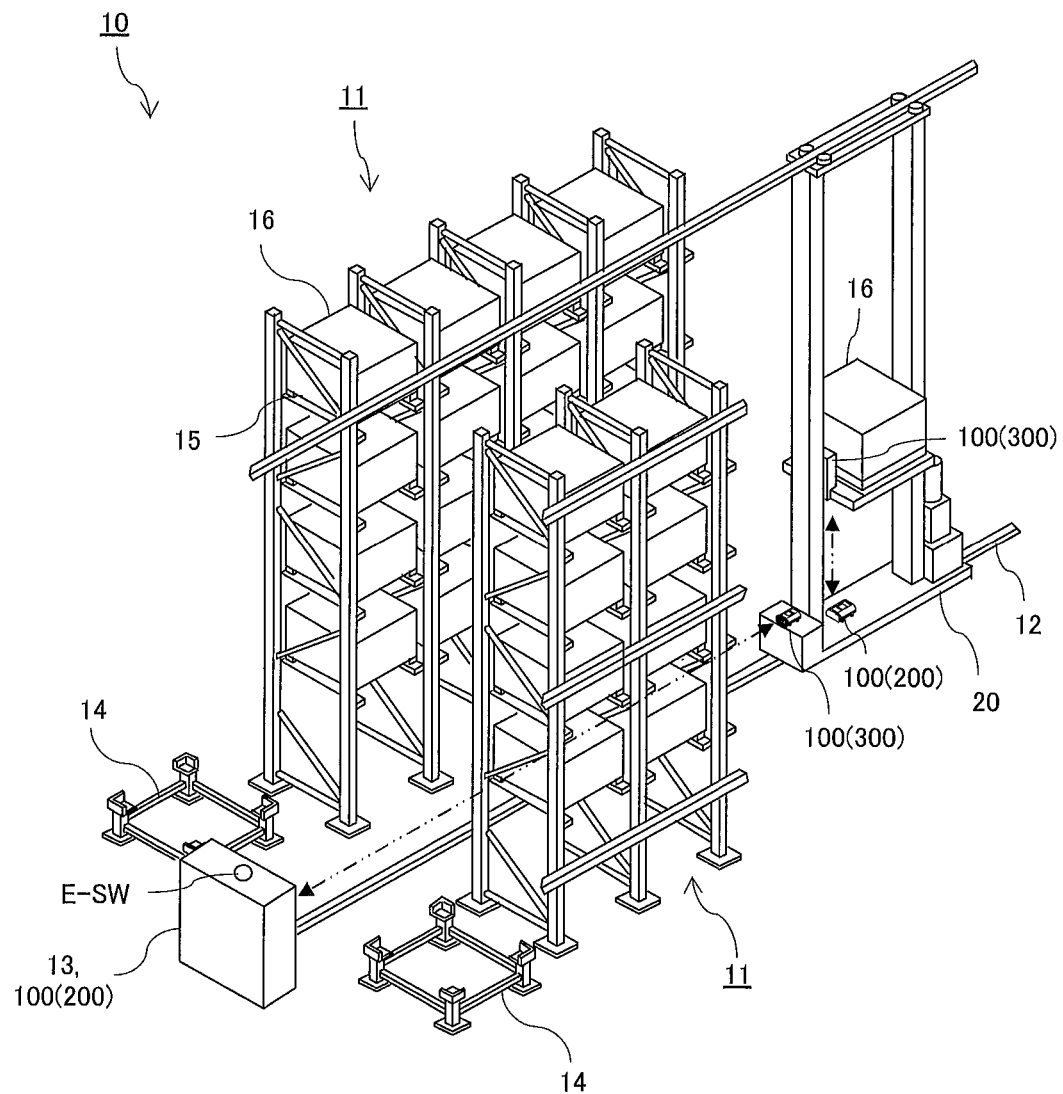
FIG. 1 is a diagram illustrating an automatic conveyance device installed in a distribution warehouse which is an example to which an optical data transmission device according to the present invention is applied.

As illustrated in FIG. 1, an automatic conveyance device is installed in a distribution warehouse 10, the automatic conveyance device including a pair of shelves 11, a rail 12 constructed between a pair of shelves 11, a stacker crane 20 moving along the rail 12, a pair of load mounting tables 14 installed on both sides of the rail 12, and a system control device 13, disposed at one end side of the rail 12, which issues storage and delivery instructions to the stacker crane 20.

Each of the shelves 11 is provided with a large number of accommodation portions 15 in the vertical and horizontal directions, and a conveyance object 16 is accommodated in each of the accommodation portions 15.

In the following description, in the traveling directions of the stacker crane 20, the direction side in which the system control device 13 is disposed is referred to as the base end side, and the opposite side thereof is referred to as the other end side. Meanwhile, the end portion of the rail 12 on the base end side is set in a reference position (home position) of the traveling movement of the stacker crane 20.

Figure 2:
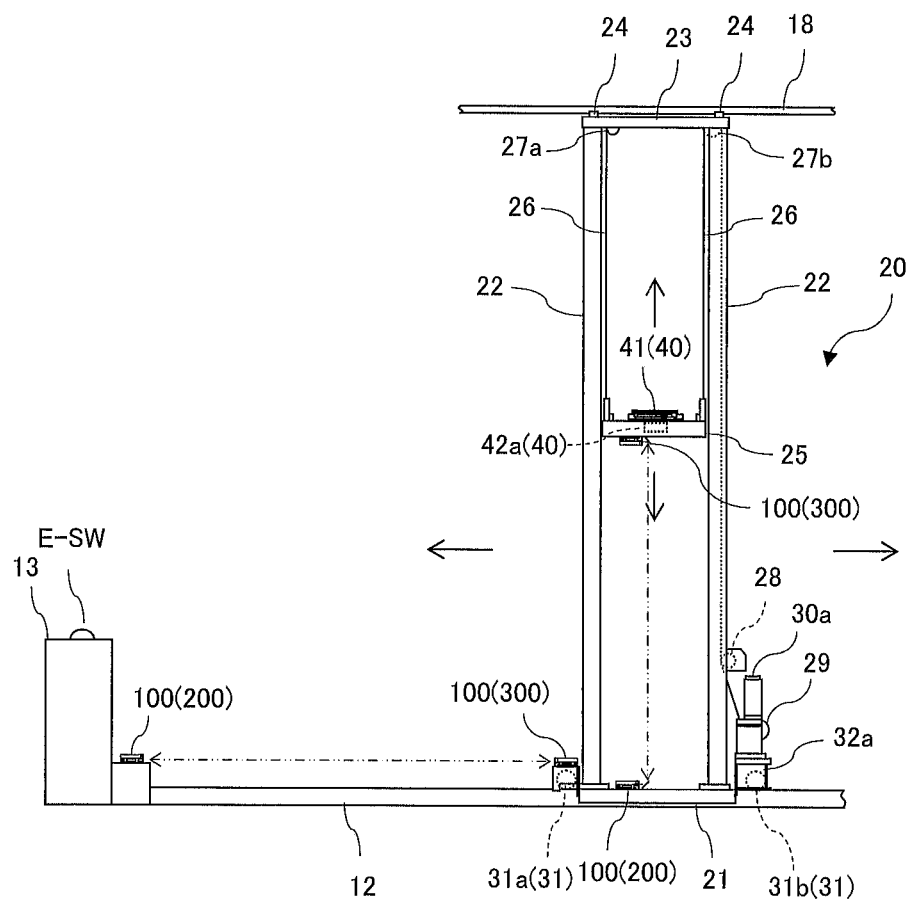
FIG. 2 is a diagram illustrating a stacker crane which is mobile equipment including the optical data transmission device.

As illustrated in FIGS. 1 and 2, the stacker crane 20 includes a traveling carriage 21 that travels along the rail 12, a pair of elevation masts 22 disposed upright in the traveling carriage 21, and an upper frame 23 that connects the pair of elevation masts 22 to each other at the upper end portion.

A plurality of guide rollers 24 which are horizontally rotated are installed on the upper frame 23, and the guide rollers 24 are rolled in clamping contact with a guide rail 18, which results in preventing the stacker crane 20 from falling.

The traveling carriage 21 includes a plurality of wheels 31 which are capable of traveling on the rail 12. Among the wheels 31, a wheel 31b on the other end side serves as a driving wheel, and a wheel 31a on the base end side serves as a driven wheel which is capable of idling. The wheel 31b is driven by a traveling servo motor 32a controlled by a servo control unit 32b (see FIG. 3).

An elevating platform 25 on which a fork gear 40 capable of transferring goods is installed, is elevatably guided and supported by the pair of elevation masts 22, through an elevating chain 26. The elevating chain 26 is wound around a winding drum 29 through a guide sprocket 28 provided to one elevation mast 22 by way of driven sprockets 27a and 27b installed on the upper frame 23.

The winding drum 29 is rotated forward and reversely by an elevating servo motor 30a controlled by a servo control unit 30b (see FIG. 3), and the elevating chain 26 is wound in or reeled out from the winding drum 29 concomitantly therewith, so that the elevating platform 25 is elevated.

The above-mentioned fork gear 40 includes a fork 41 which is slidably installed on the elevating platform 25 in the right-angled horizontal direction with respect to the traveling direction of the traveling carriage 21, a fork servo motor 42a that slides the fork 41 between a retracted position in which the fork 41 is retracted to the elevating platform 25 side and an extension position in which the fork 41 is extended to the accommodation portion 15 side, and a servo control unit 42b (see FIG. 3) that controls the servo motor 42a.

Through the horizontal movement of the traveling carriage 21, the elevation movement of the elevating platform 25, and the advance and retract operation of the fork gear 40, the conveyance object 16 mounted to a load mounting table 14 is transferred to the accommodation portion 15, and the conveyance object 16 accommodated in the accommodation portion 15 is transferred to the load mounting table 14.

When the conveyance object 16 accommodated in the accommodation portion 15 is unloaded, the elevating platform 25 is first moved up to the front of the designated position of the accommodation portion 15. Next, the fork 41 is slid from the retracted position within the elevating platform 25 to the extension position on the accommodation portion 15 side to which the conveyance object 16 is mounted, the elevating platform 25 is caused to ascend slightly in this state, and the fork 41 is slid to the retracted position again. The conveyance object 16 is mounted onto the elevating platform 25 through this operation.

When the conveyance object 16 is accommodated in the accommodation portion 15, the elevating platform 25 is first moved up to the front of the designated position of the accommodation portion 15. Next, the fork 41 to which the conveyance object 16 is mounted is slid from the retracted position within the elevating platform 25 to the extension position on the accommodation portion 15 side, the elevating platform 25 is caused to descend slightly in this state, and the fork 41 is slid to the retracted position again. The conveyance object 16 is accommodated in the accommodation portion 15 through this operation.

Figure 3:
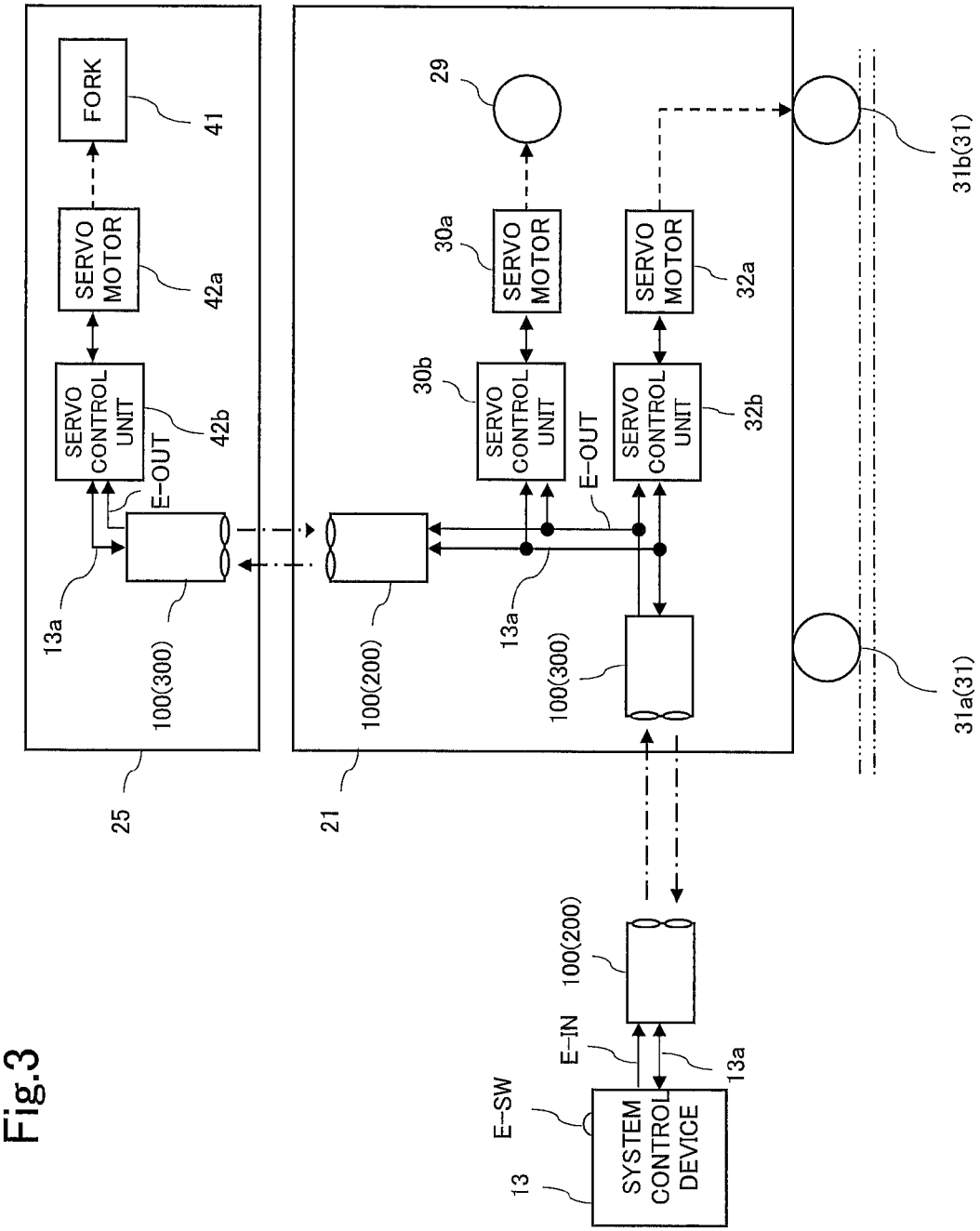
FIG. 3 is a diagram illustrating a communication path between a system control device of fixed equipment and a servo control unit of mobile equipment.

As illustrated in FIG. 3, the servo control unit 32b that controls the traveling servo motor 32a and the servo control unit 30b that controls the elevating servo motor 30a are connected to a full duplex communication line 13a, which is a wired line connected to the system control device 13, through an optical data transmission device 100, and the servo control unit 42b that controls the fork servo motor 42a is connected to the communication line 13a, which is connected to the optical data transmission device 100, through another optical data transmission device 100.

The servo motor 32a is driven by the servo control unit 32b based on control instructions from the system control device 13, and the number of rotations or rotation angle information of the servo motor 32a is fed back to the system control device 13 through the servo control unit 32b, so that the traveling position in the horizontal direction of the traveling carriage 21 is controlled by the system control device 13.

In addition, the servo motor 30a is driven by the servo control unit 30b based on the control instructions from the system control device 13, and the number of rotations, rotation angle information or the like of the servo motor 30a is fed back to the system control device 13 through the servo control unit 30b, so that the elevation position in the vertical direction of the elevating platform 25 is controlled by the system control device 13.

Further, the servo motor 42a is driven by the servo control unit 42b based on the control instructions from the system control device 13, and the number of rotations or rotation angle information of the servo motor 42a is fed back to the system control device 13 through the servo control unit 42b, so that the slide position in the horizontal direction of the fork 41 is controlled by the system control device 13.

That is, a servo communication system is configured such that each of the servo control units 32b, 30b, and 42b that receive the control instructions from the system control device 13 through the communication line 13a controls the traveling servo motor 32a, the elevating servo motor 30a, and the fork servo motor 42a, respectively, and the Ethernet (registered trademark) is used to transmit the control state thereof to the system control device 13 through the communication line 13a.

Each communication line 13a constituting the wired line includes a pair of communication lines on the transmission side and the reception side, and is formed by a copper wire cable for transmitting a series of frame data as an electrical signal, an optical fiber cable for transmitting the frame data as an optical pulse signal, or the like. In the present embodiment, although an example is described in which each communication line 13a is formed by a copper wire cable, the same is true that each communication line 13a is formed by an optical fiber cable.

The system control device 13 serves as fixed equipment according to the present invention, and the stacker crane 20 and the servo control units 30a, 30b, and 42b serve as mobile equipment according to the present invention.

As illustrated in FIGS. 1 to 3, the optical data transmission device 100 includes a first communication unit 200 and a second communication unit 300. First wired-line data which is output from the system control device 13 through the communication line 13a as a first wired line is converted into a first optical signal in the first communication unit 200 and is optically transmitted to the second communication unit 300, and the first optical signal received in the second communication unit 300 is inversely converted into the first wired-line data and is output to the servo control units 30a, 30b, and 42b through the communication line 13a as a second wired line.

In addition, a second wired-line data which is output from the servo control units 30a, 30b, and 42b through the communication line 13a as the second wired line is converted into a second optical signal in the second communication unit 300 and is optically transmitted to the first communication unit 200, and the second optical signal received in the first communication unit 200 is inversely converted into the second wired-line data and is output to the system control device 13 through the communication line 13a as the first wired line.

A switch E-SW for emergency stop is installed on a casing of the system control device 13, and bit data indicating an operation state of the switch E-SW is input to the first communication unit 200 through a signal line E-IN different from the communication line 13a as the first wired line.

The input bit data is optically transmitted as a third optical signal from the first communication unit 200 to the second communication unit 300, and is output from the second communication unit 300 through a signal line E-OUT to the servo control units 30a and 30b. Further, the bit data is transmitted, through the signal line E-OUT, from the first communication unit 200 installed on the subsequent stage thereof to the second communication unit 300, and is output to the servo control unit 42b through the signal line E-OUT.

Figure 4:
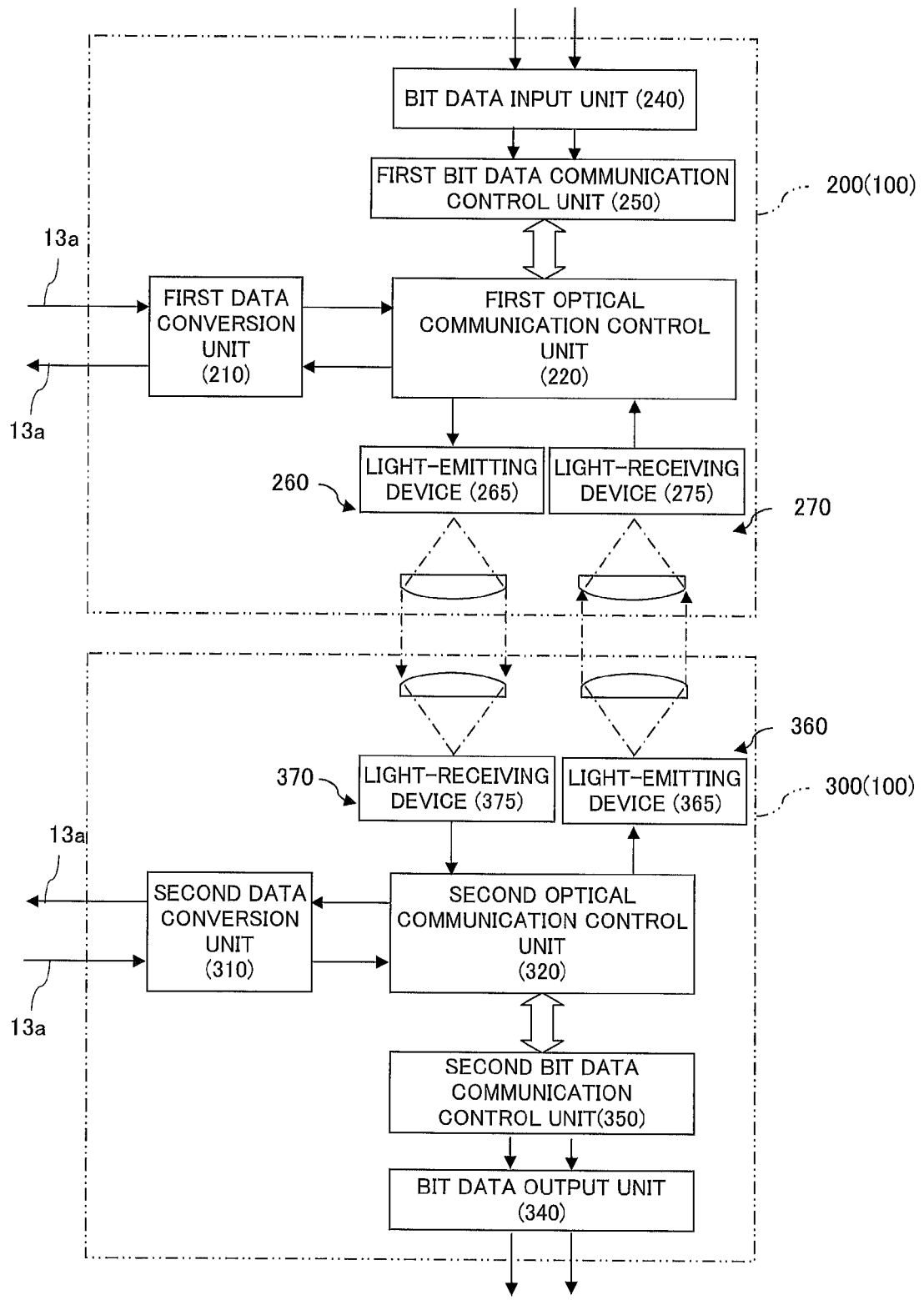
FIG. 4 is a block configuration diagram illustrating the optical data transmission device according to the present invention.

As illustrated in FIG. 4, the first communication unit 200 includes circuit blocks such as a first data conversion unit 210, a first optical communication control unit 220, a bit data input unit 240, a first bit data communication control unit 250, a light-transmitting unit 260, and a light-receiving unit 270.

The first data conversion unit 210 converts the first wired-line data which is input from the inbound communication line 13a into the first wired-line frame data for optical communication (hereinafter, simply written as "frame data") and is output to the first optical communication control unit 220, and further inversely converts the second wired-line frame data which is input from the first optical communication control unit 220 into second wired-line data and outputs the second wired-line data to the outbound communication line 13a.

The first optical communication control unit 220 transmits the first optical signal, optically modulated based on the first frame data which is input from the first data conversion unit 210, toward the second communication unit 300, and then demodulates the second frame data from the second optical signal transmitted from the second communication unit 300 and outputs the second frame data to the first data conversion unit 210.

The bit data input unit 240 includes an input circuit that inputs bit data from the signal line E-IN different from the communication line 13a.

The first bit data communication control unit 250 generates predetermined bit frame data including the bit data which is input to the bit data input unit 240 and outputs the bit frame data to the first optical communication control unit 220, and then causes the first optical communication control unit 220 to transmit the third optical signal obtained by modulating an optical carrier wave based on the bit frame data, toward the second communication unit 300, at a predetermined interval, and at the time of non-transmission of the first optical signal based on the frame data for optical communication.

The light-transmitting unit 260 is provided with a light-emitting device 265 including an infrared LED modulated by the first optical communication control unit 220, an optical lens and the like, and the light-receiving unit 270 is provided with an optical lens that receives the second optical signal transmitted from the second communication unit 300 and a light-receiving device 275 including a photodiode.

That is, the first optical communication control unit 220 is provided with a modulation circuit that modulates the light-emitting device 265 based on the input first wired-line frame data or bit frame data, and a demodulation circuit that demodulates the second wired-line frame data from the second optical signal detected in the light-receiving device 275.

The second communication unit 300 includes circuit blocks such as a second data conversion unit 310, a second optical communication control unit 320, a bit data output unit 340, a second bit data communication control unit 350, a light-transmitting unit 360, and a light-receiving unit 370.

The second data conversion unit 310 converts the second wired-line data which is input from the outbound communication line 13a as the second wired line into the second wired-line frame data and outputs the second wired-line frame data to the second optical communication control unit 320, and further inversely converts the first wired-line frame data which is input from the second optical communication control unit 320 into the first wired-line data and outputs the first wired-line data to the inbound communication line 13a as the second wired line.

The second optical communication control unit 320 transmits the second optical signal, optically modulated based on the second wired-line frame data which is input from the second data conversion unit 310, toward the first communication unit 200, and then demodulates the first wired-line frame data from the first optical signal transmitted from the first communication unit 200 and outputs the first wired-line frame data to the second data conversion unit 310.

The second bit data communication control unit 350 causes the second optical communication control unit 320 to demodulate bit frame data from the third optical signal transmitted from the first communication unit 200.

The bit data output unit 340 includes an output circuit that outputs bit data, contained in the bit frame data demodulated in the second optical communication control unit 320, from the signal line E-OUT different from the communication line 13a.

The light-transmitting unit 360 is provided with a light-emitting device 365 including an infrared LED modulated by the second optical communication control unit 320, an optical lens and the like, and the light-receiving unit 370 is provided with an optical lens that receives the first or the third optical signal transmitted from the first communication unit 200 and a light-receiving device 375 including a photodiode.

That is, the second optical communication control unit 320 is provided with a modulation Circuit that modulates the light-emitting device 365 based on the input second wired-line frame data, and a demodulation circuit that demodulates the first wired-line frame data or bit frame data from the first or the third optical signal detected in the light-receiving device 375. Hereinafter, "wired line", "wired-line data", "wired-line frame data" and "optical signal" are written without ordinal numbers.

Figure 5:
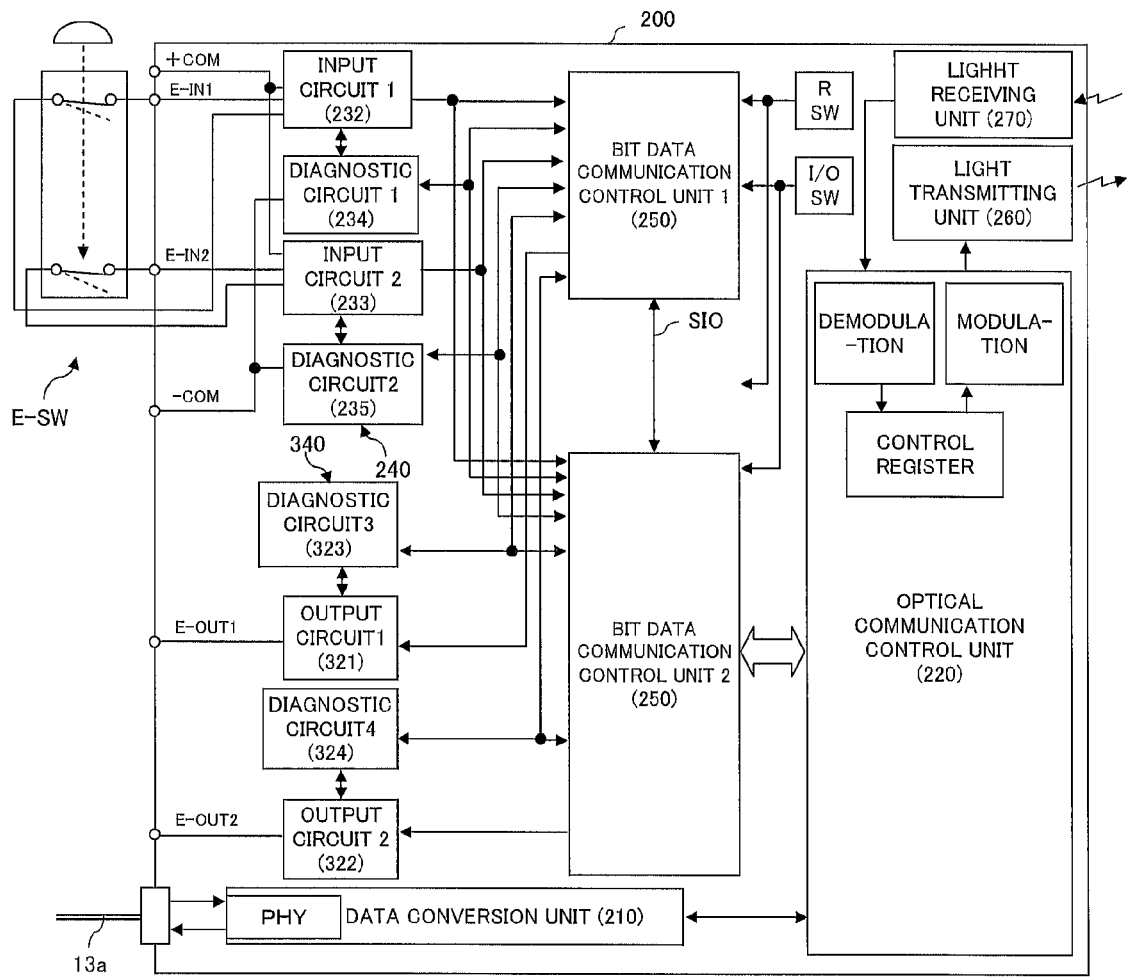
FIG. 5 is a block configuration diagram illustrating a communication unit which is a portion of the optical data transmission device.

FIG. 5 illustrates the details of each circuit block of the first communication unit 200. Meanwhile, in the present embodiment, the first communication unit 200 and the second communication unit 300 are constituted by the same circuit, and both of them are configured to include a bit data input unit and a bit data output unit and be capable of functioning as the first communication unit and the second communication unit. Therefore, in the description of FIG. 5, the name of each unit is not assigned identification notations of "first" and "second", but is simply written as the optical communication control unit, the bit data communication control unit and the like.

Meanwhile, from the viewpoint of the transmission of operation information of the switch E-SW for emergency stop included in the system control device 13 to the stacker crane 20, the present invention may include at least a bit data input unit in the first communication unit 200, and may include a bit data output unit in the second communication unit 300.

When it is necessary to transmit important bit data from the stacker crane 20 to the system control device 13, as illustrated in FIG. 5, the above-mentioned bit data input unit may be included in the second communication unit 300, and the above-mentioned bit data output unit may be included in the first communication unit 200.

The optical communication control units 220 and 320 and the bit data communication control units 250 and 350 are constituted by a micro-computer including a CPU, a gate array/FPGA or the like, and are integrated circuits in which a series of functions set in advance are executed.

The bit data input unit 240 includes two input circuits 1 and 2 denoted as signs 232 and 233, and are provided with two diagnostic circuits 1 and 2, denoted as signs 234 and 235, for diagnosing an operation of each of the input circuits 1 and 2.

The switch E-SW for emergency stop is a self-holding two-circuit one-contact switch in which a one-time operation opens a contact and a follow-up operation closes a contact, and is configured so that the switch E-SW and each of the input circuits 1 and 2 are connected to each other through signal line pairs E-IN1 (+E-IN1, −E-IN1) and E-IN2 (+E-IN2, −E-IN2), and each contact signal is input to each of the input circuits 1 and 2.

Contact voltages of the switch E-SW for emergency stop are input to the input circuits 1 and 2, and a signal voltage converted into 2-bit data which is set at a high level voltage or a low level voltage is input to the bit data communication control unit 250.

The diagnostic circuits 1 and 2 are circuits that diagnose whether the operations of the above-mentioned input circuits 1 and 2 are proper, whether the connection of the input circuits 1 and 2 to the switch E-SW is proper, or the like.

The bit data communication control unit 250 can diagnose whether the operations of the input circuits 1 and 2 are proper by controlling the diagnostic circuits 1 and 2 to check a logic level of an input signal through the input circuits 1 and 2.

That is, the input circuits and the diagnostic circuits are redundantly installed, and the bit data communication control units that control the diagnostic circuits to diagnose the input circuits are further redundantly installed. When two bit data communication control units 1 and 2 denoted as signs 250 and 250 are connected to each other through a serial communication line SIO, and at least one bit data communication control unit 1 controls each of the diagnostic circuits 1 and 2 to diagnose each of the input circuits 1 and 2, the another bit data communication control unit 2 is also configured to diagnose each of the input circuits 1 and 2.

When two bit data communication control units 1 and 2 double-check whether the input circuits 1 and 2 are normal based on information transferred through the serial communication line SIO, and determine that all the diagnosis results are normal, at least one bit data communication control unit 1 generates bit frame data into which a status code indicating the normal state is incorporated, and outputs the bit frame data to the optical communication control unit 220.

Meanwhile, the bit data communication control unit diagnoses not only the input circuit in which the diagnostic circuit is controlled, but also whether each input level of the input signals E-IN1 and E-IN2 from E-SW through the input circuit is consistent with each other during a normal operation. The bit frame data will be described later in detail.

The bit data output unit 340 includes two output circuits 1 and 2 denoted as signs 321 and 322, and is provided with two diagnostic circuits 3 and 4, denoted as signs 323 and 324, for diagnosing the operations of each of the output circuits 1 and 2.

The output circuits 1 and 2 are driver circuits that output a 2-bit signal voltage which is output from the bit data communication control unit 350 to the servo control units 30a and 30b.

The 2-bit signal voltage is a signal voltage converted into 2-bit data which is set at a high level voltage or a low level voltage which corresponds to a contact voltage of the switch E-SW for emergency stop. When it is determined that the switch E-SW for emergency stop is operated, the servo control units 30a and 30b which receive signals from the output circuits 1 and 2 perform an emergency stop control on the servo motor of the stacker crane 20.

Meanwhile, only when both 2-bit signal voltages are logic levels indicating that the switch E-SW for emergency stop is operated, a logic circuit such as an AND circuit is provided between the output circuits 1 and 2 and the servo control units 30a and 30b so as to perform an emergency stop control on the servo motor of the stacker crane 20.

The diagnostic circuits 3 and 4 are circuits that diagnose whether the operations of the above-mentioned output circuits 1 and 2 are proper. The bit data communication control unit 350 controls the diagnostic circuits 3 and 4, and diagnoses whether the operations of the output circuits 1 and 2 are proper.

That is, the output circuits and the diagnostic circuits are redundantly installed, and the bit data communication control units that control the diagnostic circuits to diagnose the output circuits are further redundantly installed. When two bit data communication control units 1 and 2 denoted as signs 350 and 350 are connected to each other through the serial communication line SIO, and at least one bit data communication control unit 1 controls each of the diagnostic circuits 3 and 4 to diagnose each of the output circuits 1 and 2, another bit data communication control unit 2 is also configured to diagnose each of the output circuits 1 and 2.

Hereinafter, specific examples of the input circuits 1 and 2, the output circuits 1 and 2, and the diagnostic circuits 1, 2, 3, and 4 mentioned above will be described.

Figure 13:
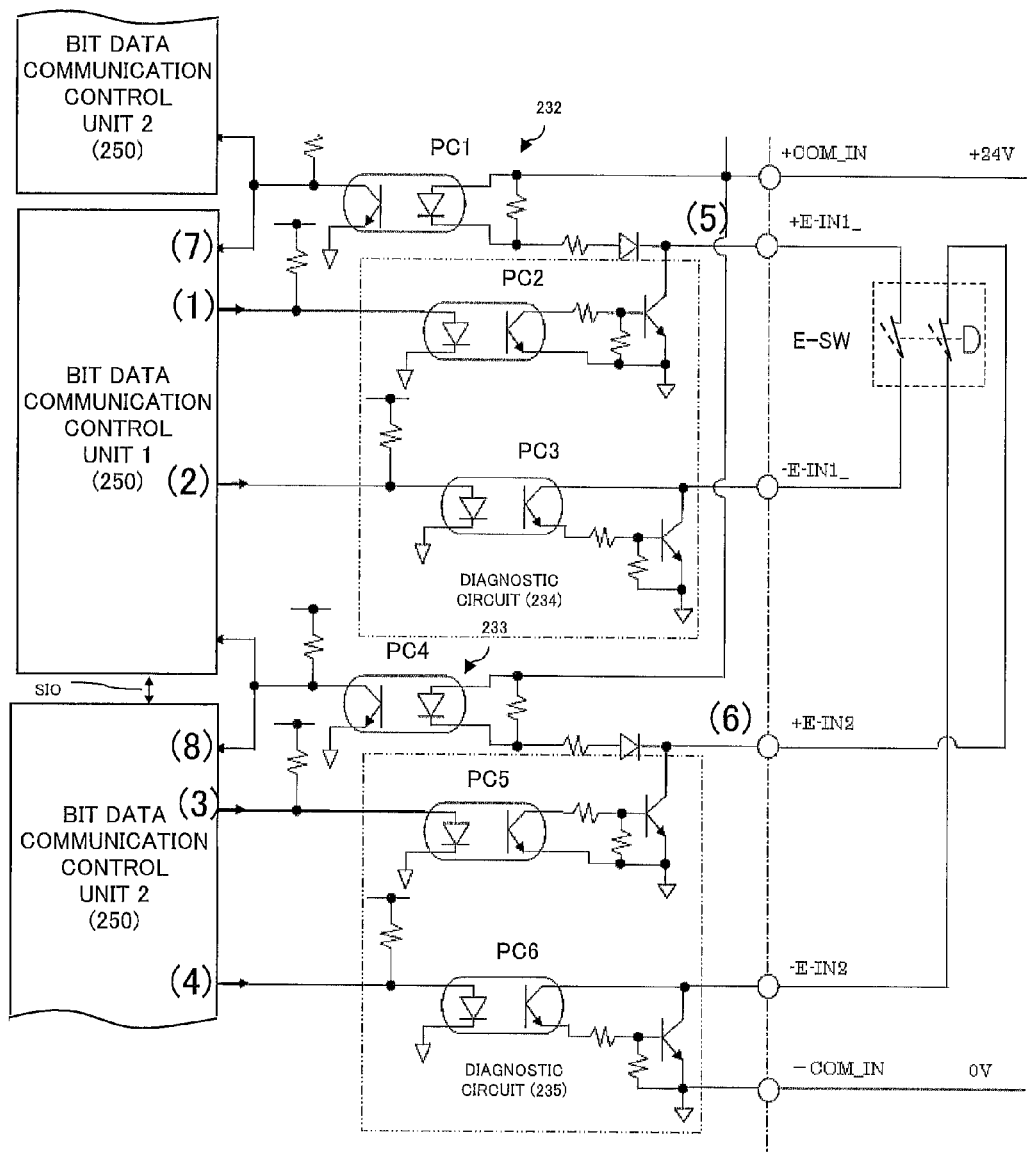
FIG. 13 is a diagram illustrating an input circuit and a diagnostic circuit.

FIG. 13 illustrates an input circuit 232 including a photo-coupler PC1, an input circuit 233 including a photo-coupler PC4, a diagnostic circuit 234 that diagnoses an operation of the input circuit 232, and a diagnostic circuit 235 that diagnoses an operation of the input circuit 233.

A voltage supplied from a power source voltage terminal +COM IN is connected to a positive terminal of the switch E-SW through the input circuits 232 and 233, and a negative terminal of the switch E-SW is connected to a power source voltage terminal −COM IN through the diagnostic circuits 234 and 235.

The diagnostic circuit 234 includes a switch circuit including a photo-coupler PC2 connected to +E-IN1 of the switch E-SW and a switch circuit including a photo-coupler PC3 connected to −E-IN1 of the switch E-SW.

Similarly, the diagnostic circuit 235 includes a switch circuit including a photo-coupler PC5 connected to +E-IN2 of the switch E-SW and a switch circuit including a photo-coupler PC6 connected to −E-IN2 of the switch E-SW.

When the bit data communication control unit 1 outputs a predetermined diagnosis pulse to the diagnostic circuit 234 and the bit data communication control unit 2 outputs a predetermined diagnosis pulse to the diagnostic circuit 235 while communicating with each other through the communication line SIO, the normality and abnormality of the input circuit and the wiring are determined based on values which are input from the input circuits 232 and 233.

Figure 14:
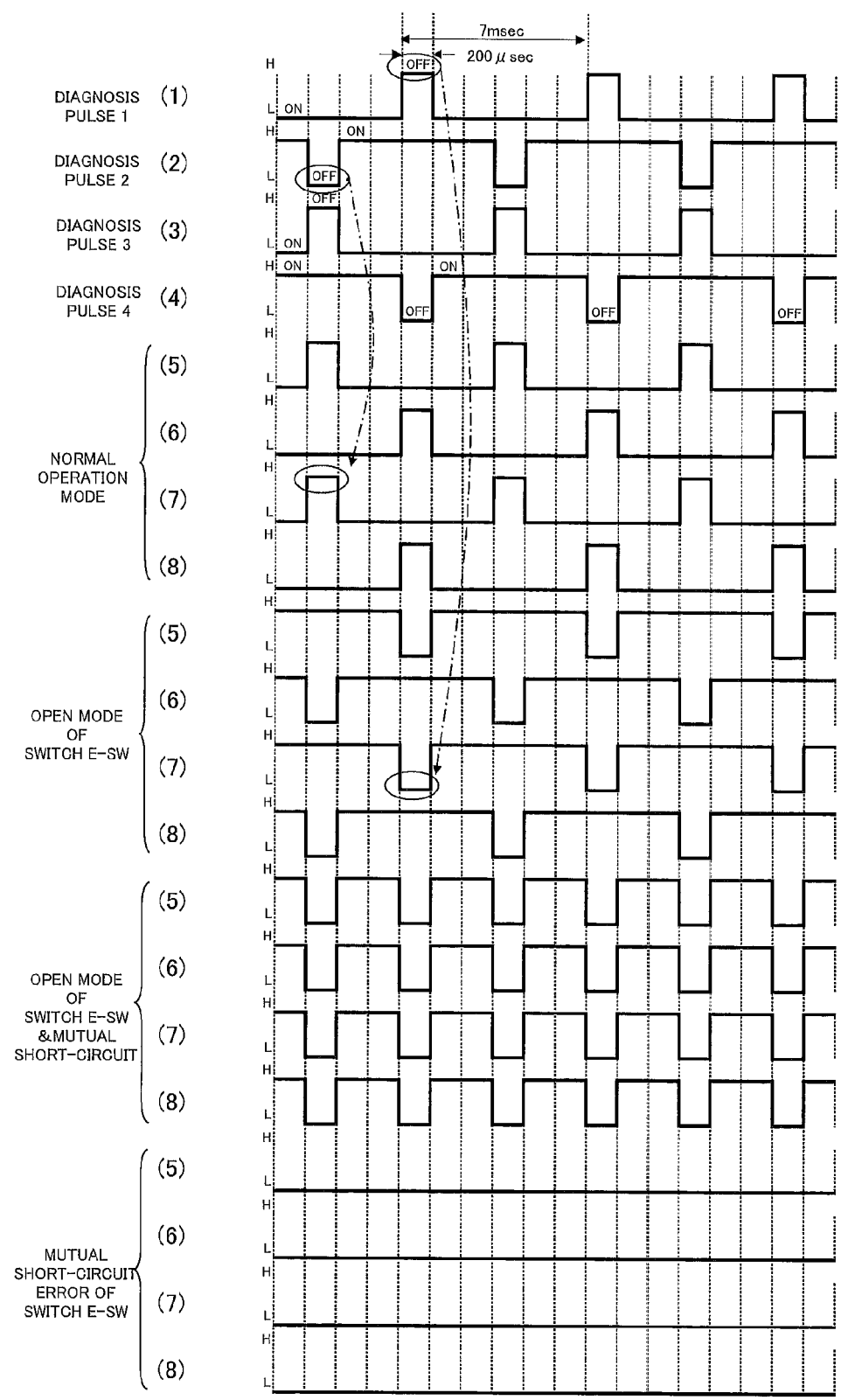
FIG. 14 is a signal diagram illustrating the diagnostic circuit.

FIG. 14 illustrates signal waveforms which are input from the input circuits 232 and 233 in response to the diagnosis pulses which are output from the bit data communication control units 1 and 2 to the diagnostic circuits 234 and 235. Numbers in parentheses in FIG. 14 are signal waveforms of regions corresponding to numbers in parentheses in FIG. 13.

The bit data communication control unit 1 outputs a diagnosis pulse 1 having a pulse width of 200 μs at a period of 7 ms to the switch circuit including the photo-coupler PC2, and outputs a diagnosis pulse 2 of which phase is inverted with respect to the diagnosis pulse 1 and which is deviated by a half-period, to the switch circuit including the photo-coupler PC3. The bit data communication control unit 2 outputs a diagnosis pulse 3 of which phase is deviated by a half-period with respect to the diagnosis pulse 1 to the switch circuit including the photo-coupler PC5, and outputs a diagnosis pulse 4 of which phase is deviated by a half-period with respect to the diagnosis pulse 2 to the switch circuit including the photo-coupler PC6.

In a normal operation mode in which the switch E-SW is not operated and is in a conduction state, a signal of which logic is inverted with respect to the diagnosis pulse 2 is input to the input circuit 232 in synchronization with the diagnosis pulse 2, and a signal of which logic is inverted with respect to the diagnosis pulse 4 is input to the input circuit 233 in synchronization with the diagnosis pulse 4.

In an open mode in which the path of the switch E-SW is in an open state, a signal of which logic is inverted with respect to the diagnosis pulse 1 is input to the input circuit 232 in synchronization with the diagnosis pulse 1, and a signal of which logic is inverted with respect to the diagnosis pulse 3 is input to the input circuit 233 in synchronization with the diagnosis pulse 3.

When the switch E-SW is operated and thus is in an open state, and a pair of lines of the switch E-SW on the power source side are mutually short-circuited, a pulse signal having a period of 3.5 ms is input to the input circuit 232 in synchronization with the diagnosis pulse 1 and the diagnosis pulse 2, and a pulse signal having a period of 3.5 ms is input to the input circuit 233 in synchronization with the diagnosis pulse 3 and the diagnosis pulse 4.

When the path of the switch E-SW is in a conduction state, and a pair of lines of the switch E-SW on the power source side or a pair of lines thereof on the ground side are mutually short-circuited, a signal which is set at a low level is constantly input to the input circuit 232 regardless of the diagnosis pulses 1 and 2, and a signal which is set at a low level is constantly input to the input circuit 233 regardless of the diagnosis pulses 3 and 4.

In this manner, the bit data communication control units 1 and 2 are configured to diagnose the presence or absence of the abnormalities of the input circuits 232 and 233 by constantly checking the input levels of the input circuits 232 and 233 in synchronization with each diagnosis pulse and checking results through the communication line SIO. Meanwhile, the period of the diagnosis pulse and the duty ratio are merely exemplary, and are not limited to these values.

Figure 15:
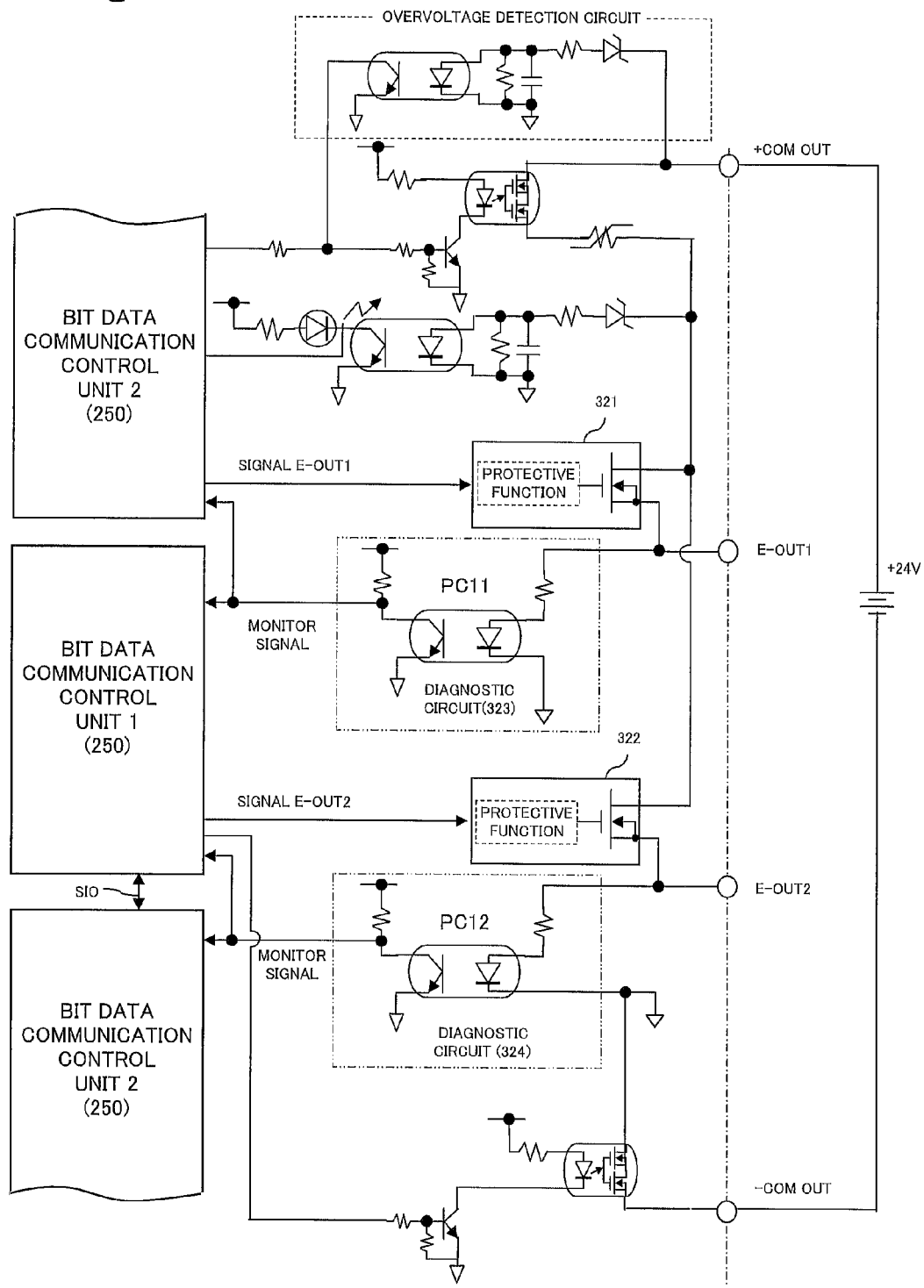
FIG. 15 is a diagram illustrating an output circuit and the diagnostic circuit.

FIG. 15 illustrates a pair of output circuits 321 and 322 that output signals E-OUT1, E-OUT2 corresponding to the received bit data, and a pair of diagnostic circuits 323 and 324 that diagnose an operation of each of the output circuits 321 and 322.

At the time of the diagnosis, similarly to the above-mentioned diagnosis of the input circuit, diagnosis pulses E-OUT1 and E-OUT2 of which phase is deviated by a half-period at a period of 7 ms in a pulse width of 200 μs are output from the bit data communication control units 1 and 2, and monitor signals from the diagnostic circuits 323 and 324 are checked in synchronization with the diagnosis pulses.

The bit data communication control units 1 and 2 determine that a failure such as a short-circuit of the output circuit happened when the diagnosis pulse shows no change in the voltage level of a monitor signal, forcibly set the output circuits 321 and 322 to be in an off-state, and turn off output common±COM OUT.

Meanwhile, the input circuits 1 and 2, the output circuits 1 and 2, and the diagnostic circuits 1, 2, 3, and 4 are merely exemplary, and the diagnostic circuit and the like of the present invention are not limited thereto.

Further, a rotary switch R-SW and an input and output changeover switch I/O-SW are connected to the bit data communication control units 1 and 2. The rotary switch R-SW is a switch functioning as a first or second identification code setting unit that sets predetermined identification codes in the bit data communication control units 1 and 2.

The input and output changeover switch I/O-SW is a changeover switch for causing the bit data communication control unit to function as the first bit data communication control unit that optically transmits the input bit data, or to function as the second bit data communication control unit that receives and outputs the bit data optically transmitted.

Figure 9A:
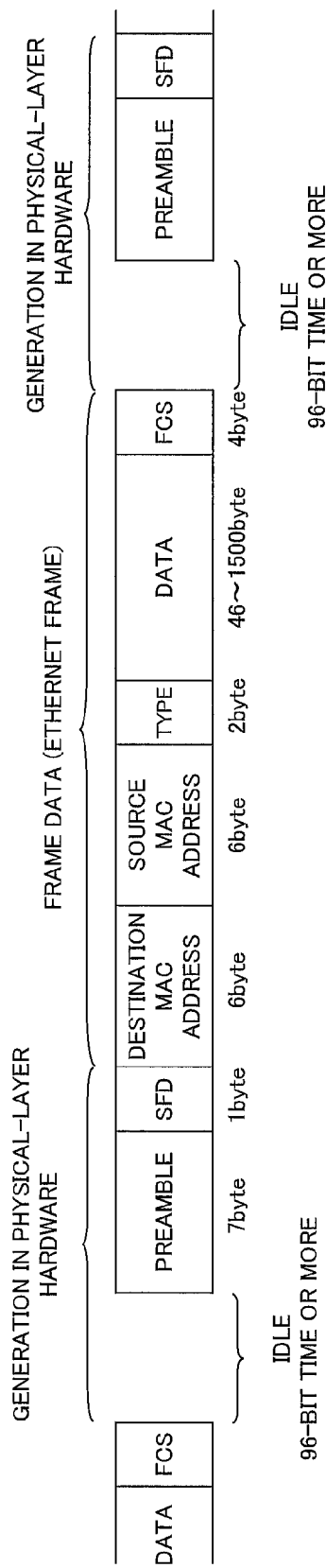
FIG. 9($a$) is a diagram illustrating frame data of wired-line data transmitted and received through a wired line, and FIG. 9($b$) is a diagram illustrating bit frame data including bit data which is input from a bit data input unit.

FIG. 9(a) illustrates frame data of the Ethernet (registered trademark) which is an example of wired-line data transmitted in the communication line 13a. The frame data is constituted by a 7-byte "preamble" field, a 1-byte "SFD (Start Frame Delimiter)" field, a 6-byte "destination address" field, a 6-byte "source address" field, a 2-byte "length/type" field, a "data" field that is from the minimum 46 bytes to the maximum 1500 bytes, and a 4-byte "FCS" field.

Among the frame data, the "preamble" field and the "SFD" field are generated in a physical-layer hardware, the remaining fields are generated in an application software for communication. In the physical-layer hardware, an idle time of 96-bit time or more is secured between the frames.

Referring back to FIG. 5, a PHY chip based on the MII (Media Independent Interface) standard is included in the data conversion unit 210 (310), the above-mentioned variable-length frame data transmitted at a transmission rate of 10 MBPS through the communication line 13a on the transmission side is divided into parallel data of a 4-bit unit by the PHY chip, and wired-line frame data for optical communication is generated based on the parallel data of a 4-bit unit. The wired-line frame data is a baseband signal for modulating an optical signal. Meanwhile, the above-mentioned "preamble" field is excluded from the wired-line frame data.

In addition, a baseband signal is demodulated from the optical signal received in the optical communication control unit 220 (320), and the parallel data of a 4-bit unit generated from the baseband signal is inversely converted into frame data of the Ethernet (registered trademark) by the PHY chip and is further output to the communication line 13a on the reception side after the above-mentioned "preamble" field is added.

The optical communication control unit 220 (320) includes a modulation unit that modulates the light-emitting device 265 (365) based on the frame data for optical communication which is input from the data conversion unit 210 (310), and a demodulation unit that demodulates an optical signal received in the light-receiving device 275 (375) to regenerate the frame data for optical communication. A modulation or demodulation scheme is not particularly limited, but a PSK (phase shift keying) scheme, an FSK (frequency shift keying) scheme, an ASK (amplitude shift keying) scheme or the like may be appropriately selected. In the present embodiment, the PSK scheme is adopted.

Figures 6A, 6B:
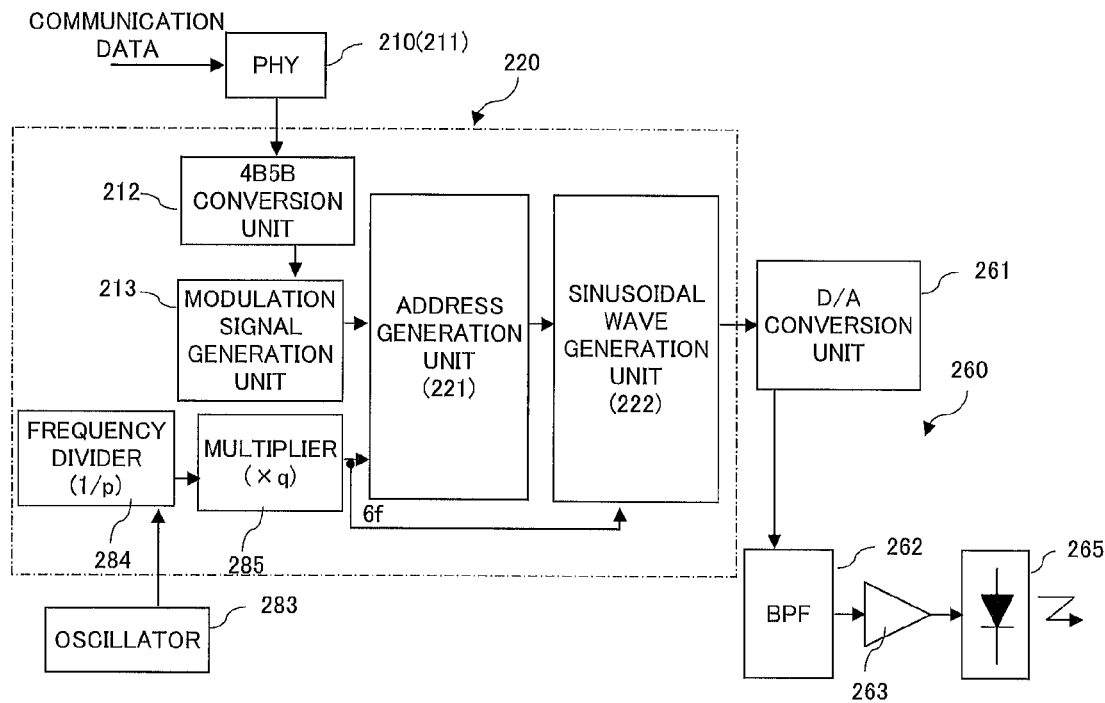
FIG. 6($a$) is a block configuration diagram illustrating a region that executes a modulation process in an optical communication control unit, and FIG. 6($b$) is a diagram illustrating a relationship between address information generated in an address generation unit and a data table in which amplitude data corresponding to phases of a carrier signal is set.

FIG. 6(a) illustrates a modulation unit of the optical communication control unit 220 and functional blocks of the light-transmitting unit 260.

The modulation unit is provided with a 4B5B conversion unit 212, a modulation signal generation unit 213, an address generation unit 221, a sinusoidal wave generation unit 222 used as a modulated signal generation unit, and the like. The light-transmitting unit 260 is provided with a D/A conversion unit 261, a band-pass filter 262, a driver 263, and a light-emitting device 265.

After the parallel data of a 4-bit unit, which is output from a PHY chip 211, is converted in a 4B5B conversion by the 4B5B conversion unit 212, the parallel data is converted into serial data and is output to the modulation signal generation unit 213 at a transmission rate of 12.5 MBPS. That is, a code conversion process is performed on the frame data transmitted from the communication line 13a so that the same code is not repeated by equal to or more than a predetermined number of symbols (here, 5 symbols) in succession. Meanwhile, the PHY chip 211 in which the 4B5B conversion unit 212 is incorporated may be used.

The modulation signal generation unit 213 detects punctuations between frames which are continuously sent out based on a transmission control signal which is output from the PHY chip 211, and generates a modulation signal (baseband signal) obtained by inserting a punctuation signal in which the same code (here, 0) is repeated by equal to or more than a predetermined number of symbols (here, 5 symbols) in succession between each frame to output the modulation signal to the address generation unit 221. Meanwhile, the transmission control signal is a control signal that rises immediately before the transmission of a head symbol of the frame, and falls immediately after the transmission of a final symbol of the frame.

A clock signal which is output from an oscillator 283 is converted into a clock signal of 240 MHz through a frequency divider 284 and a multiplier 285, and the clock signal is input to the address generation unit 221 and the sinusoidal wave generation unit 222.

As illustrated in FIG. 6(b), the sinusoidal wave generation unit 222 is provided with a data table in which amplitudes 0.5, 1.0, 0.5, −0.5, −1.0, and −0.5 corresponding to each phase 30°, 90°, 150°, 210°, 270°, and 330° of a carrier signal of a sinusoidal wave are set as 10-bit data from 0 to 1023. The value 0 of the data table corresponds to the amplitude of −1.0, the value 1023 of the data table corresponds to the amplitude of 1.0, and the value 511 of the data table corresponds to the amplitude of 0.

Each amplitude data of each phase 30°, 90°, 150°, 210°, 270°, and 330° is accessed in accordance with each address from 0 to 5 generated in the address generation unit 221.

Meanwhile, the amplitudes stored in the data table are not limited to values corresponding to phases 30°, 90°, 150°, 210°, 270°, and 330°, but may be values corresponding to phases 0°, 60°, 120°, 180°, 240°, and 300°. In addition, the amplitude for each phase may be set in accordance with the clock of the multiplication of the carrier frequency.

The address generation unit 221 includes a ring counter that repeatedly counts values from 0 to 5, and a counter control unit that controls count values of the ring counter by sampling a modulation signal, which is input at a transmission rate of 12.5 MBPS, at 240 MHz.

The counter control unit adds 1 to the value of the ring counter when the symbol value of the sampled modulation signal is consistent with a previous sampling value, adds 2 to the value of the ring counter when the symbol value changes from 0 to 1, and adds −1 to the value of the ring counter when the symbol value changes from 1 to 0.

Therefore, amplitude data of a sinusoidal wave of 40 MHz (=240 MHz/6) is output from a sinusoidal wave generation unit 126 when the symbol value of the sampled modulation signal is consistent with a previous sampling value, amplitude data of a sinusoidal wave of which the phase leads by 60° is output when the symbol value changes from 0 to 1, and amplitude data of an original sinusoidal wave of which the phase lags by 120° is output when the symbol value changes from 0 to 1. That is, binary phase shift keying (BPSK) is performed in the modulation unit.

Figure 7A:
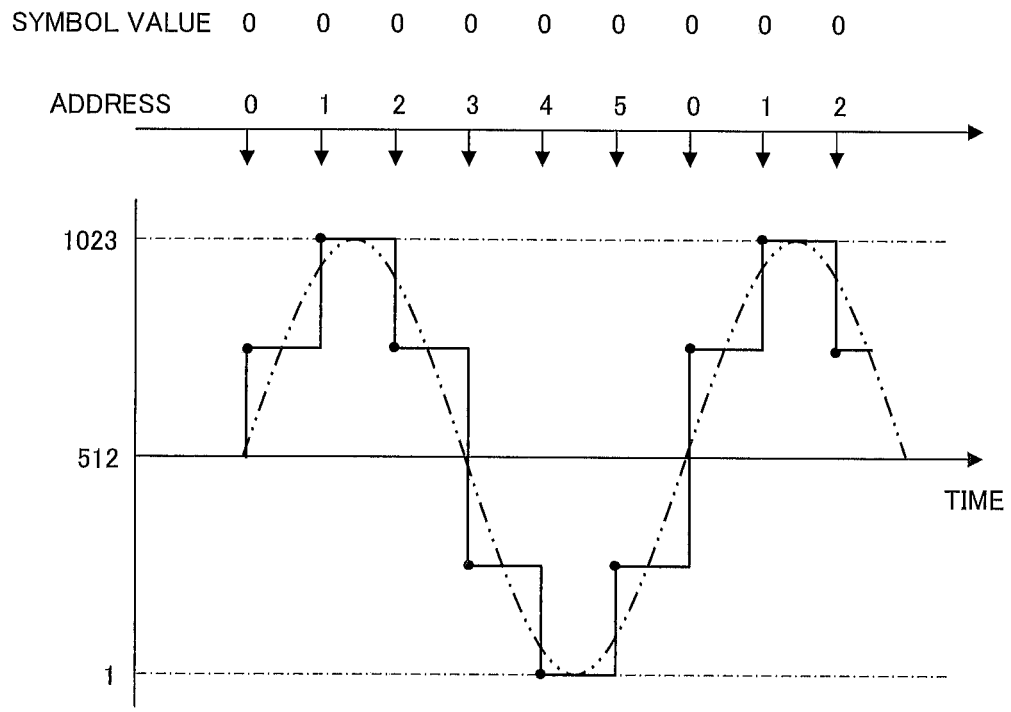
FIG. 7($a$) is a diagram illustrating a phase modulation signal indicating a reference phase, and FIG. 7($b$) is a diagram illustrating a phase modulation signal transitioning from the reference phase.

As illustrated in FIG. 7(a), when the same symbol value 0 is continuous in the modulation signal, amplitude data corresponding to a sinusoidal wave of 40 MHz which is output from the sinusoidal wave generation unit 222 is expressed as a stepwise waveform.

Figure 7B:
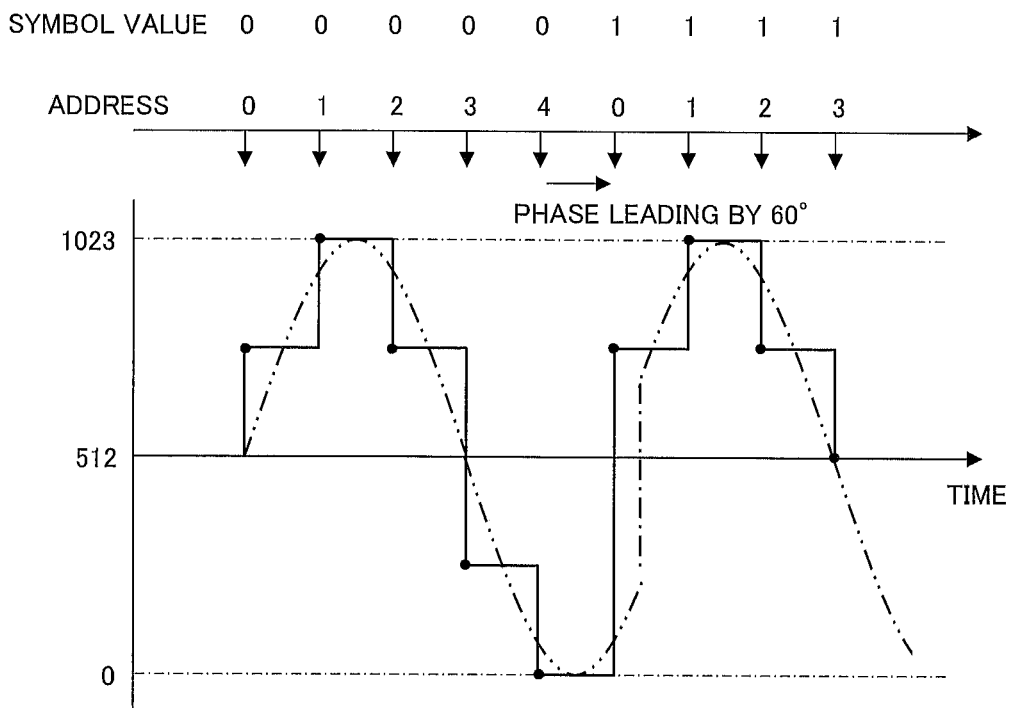

As illustrated in FIG. 7(b), when the symbol value of the modulation signal changes from 0 to 1 on the way, amplitude data corresponding to a sinusoidal wave of 40 MHz which is output from the sinusoidal wave generation unit 222 is expressed as a stepwise waveform. The phase leads by 60° at the point of time in which the symbol value changes from 0 to 1.

The amplitude data which is output from the sinusoidal wave generation unit 222 is converted into an analog signal by the D/A conversion unit 261, and harmonic components are removed by the band-pass filter 262, so that waveforms are formed in sinusoidal waves indicated by the two-dot chain lines in FIGS. 7(a) and 7(b), and are output to the driver 263. A voltage obtained by superposing a sinusoidal voltage on a predetermined DC bias voltage is applied to the light-emitting device 265 by the driver 263, so that a phase-modulated optical signal is output from the light-emitting device 265.

That is, the optical signal is phase-modulated by a modulation signal constituted by a baseband signal on which a code conversion process is performed so that the same code is not repeated by equal to or more than a predetermined number of symbols in succession, and a punctuation signal in which the same code is repeated by equal to or more than a predetermined number of symbols in succession between baseband signals continuous in time-series.

In addition, the modulation unit includes a data table and an address generation unit that generates address information of a data table in which amplitude data corresponding to the phase of the carrier signal is set based on the symbol of a modulation signal, and includes a modulated signal generation unit that outputs a corresponding amplitude in the data table as a digital amplitude signal based on the address information which is output from the address generation unit.

Further, the address generation unit includes a ring counter which is counted in synchronization with a reference oscillation clock of the multiplication frequency of the carrier frequency and is reset in one period of a carrier, and a counter control unit that causes a count value of the ring counter to be different based on a change in the symbol of the modulation signal.

Figures 8A, 8B:
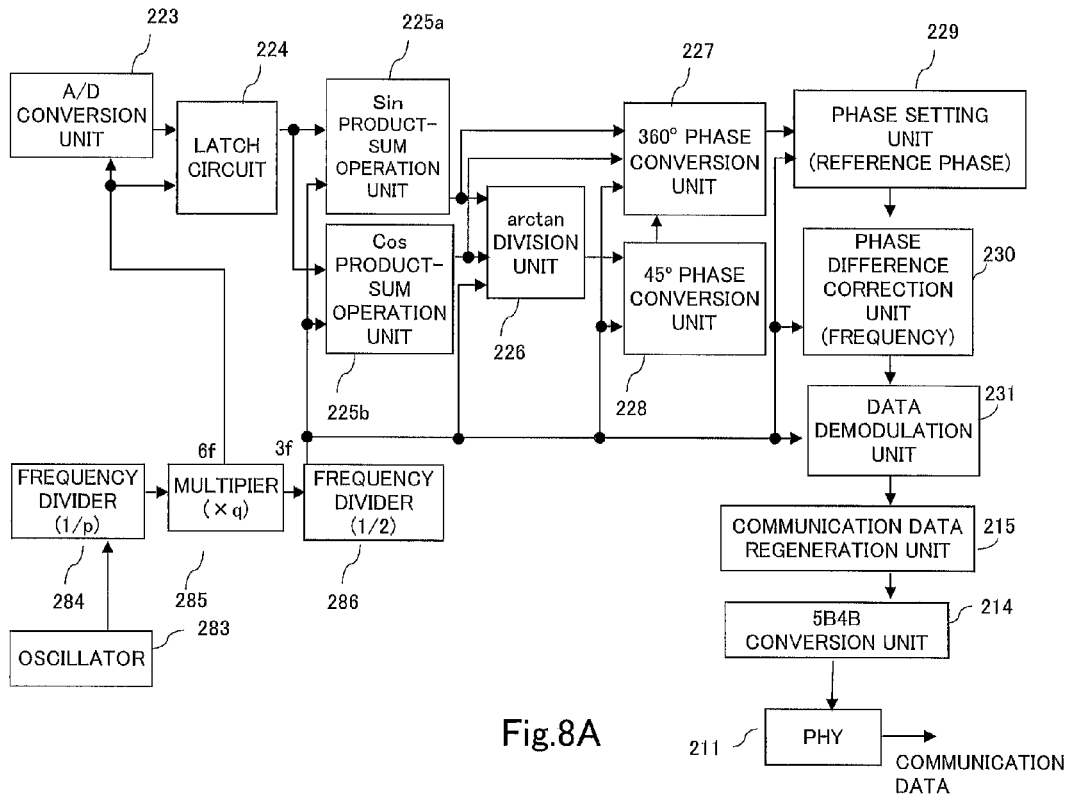
FIG. 8($a$) is a block configuration diagram illustrating a region that executes a demodulation process in the optical communication control unit, and FIG. 8($b$) is a diagram illustrating a data table in which amplitude data of an orthogonal reference signal is set as a-power-of-2 data.

FIG. 8(a) illustrates functional blocks of a demodulation unit of the optical communication control unit 220.

The demodulation unit is provided with a 5B4B conversion unit 212, a communication data regeneration unit 215, an A/D conversion unit 223, a latch circuit 224, product-sum operation units 225a and 225b, a division unit 226, phase conversion units 227 and 228, a phase setting unit 229, a phase difference correction unit 230, and a data demodulation unit 231.

In the A/D conversion unit 223, an analog received signal which is photo-electrically converted in the light-receiving device 275 and is amplified in a trans-impedance amplifier is converted into an 8-bit digital received signal by a local oscillation clock of the multiplication frequency of the carrier frequency. Specifically, the A/D conversion unit 223 is driven by a clock signal of 240 MHz which is output from the multiplier 285, and samples a received signal dm (m; 0, 1, 2, 3, 4, and 5) at a frequency six times the carrier frequency of 40 MHz.

The 8-bit received signal sampled at 240 MHz is input to the product-sum operation units 225a and 225b through the latch circuit 224. The product-sum operation units 225a and 225b execute a product-sum operation of a received signal converted into digital data in the A/D conversion unit 223 and an orthogonal reference signal in synchronization with a local oscillation clock.

Meanwhile, the signal processing blocks subsequent to the product-sum operation units 225a and 225b are driven by a clock divided into 120 MHz by a frequency divider 286. The 8-bit digital data dm sampled at 240 MHz is stored in the latch circuit 224 by 2 bytes, and is input to the product-sum operation units 225a and 225b in a 2-byte unit in synchronization with the clock of 120 MHz.

As illustrated in FIG. 8(b), the product-sum operation unit 225a includes an operation unit and a data table in which amplitude data of sinusoidal waves corresponding to phases 0°, 60°, 120°, 180°, 240°, and 300° is stored, and a product-sum operation Ss expressed as the following expression is executed by the operation unit between the digital data dm latched by the latch circuit 224 and the amplitude data stored in the data table.

$$Ss = \Sigma(dm \cdot Sin(2\pi m/6))$$
$$= d0 \cdot Sin0° + d1 \cdot Sin60° + d2 \cdot Sin120° +$$
$$d3 \cdot Sin180° + d4 \cdot Sin240° + d5 \cdot Sin300°$$

The product-sum operation unit 225b includes an operation unit and a data table in which amplitude data of cosine waves corresponding to phases 0°, 60°, 120°, 180°, 240°, and 300° is stored, and a product-sum operation Sc expressed as the following expression is executed by the operation unit between the digital data dm latched by the latch circuit 224 and the amplitude data stored in the data table.

$$Sc = \Sigma(dm \cdot Cos(2\pi m/6))$$
$$= d0 \cdot Cos0° + d1 \cdot Cos60° + d2 \cdot Cos120° +$$
$$d3 \cdot Cos180° + d4 \cdot Cos240° + d5 \cdot Cos300°$$

As shown in columns of a Sin simple value and a Cos simple value of FIG. 8(b), in the present embodiment, amplitude data of orthogonal reference signals Sin and Cos stored in the data table is set as a-power-of-2 data. Therefore, the above-mentioned operation unit is configured so that the product of the received signal and the orthogonal reference signal is calculated by performing a shift operation on the received signal based on the power-of-2 data. The operation unit capable of forming a compact circuit configuration and performing a high-speed operation is realized by adopting such a simple operation process.

For example, the orthogonal reference signal Sin becomes tenfold uniformly, and is set to an expression of $10 \cdot Sin(2\pi/6) \approx 8.66 \approx 8$. Therefore, in the operation process of $d1 \cdot Sin 60°$, the result thereof is calculated by shifting the received signal d1 to the left by 3 bits.

For example, the orthogonal reference signal Cos becomes eightfold uniformly, and is set to an expression of $8 \cdot Cos(2\pi \cdot 2/6) = -4$. Therefore, in the operation process of $d2 \cdot Cos 120°$, the result thereof is calculated by acquiring a complement of a value obtained by shifting the received signal d2 to the right by 2 bits.

In the division unit 226, Ss and Sc which are output from the product-sum operation units 225a and 225b in synchronization with a clock are divided by each other based on the following expression to calculate Arctan θ'. θ'=Arctan (Sc/Ss)

The phase θ' corresponding to the value of Sc/Ss is acquired by the phase conversion unit 228 including the data table in which the value of the phase θ in a range of ±45° is stored.

In the phase conversion unit 227, the phase θ in a range of 360° is acquired from the relationship between the phase θ and Ss and Sc which are output from the product-sum operation units 225a and 225b.

That is, a phase detection unit is configured which executes a product-sum operation of the received signal and the orthogonal reference signal generated in the A/D conversion unit in synchronization with a local oscillation clock through the product-sum operation units 225a and 225b, the division unit 226, and the phase conversion units 227 and 228, and calculate the phase based on the product-sum operation result.

The phase setting unit 229 determines whether the received signal dm is a punctuation signal in which 0 is repeated by 5 symbols or more in succession based on the clock signal of 120 MHz, and stores the phase 0 (=) 30° as a reference phase corresponding to data 0 in a memory, when the received signal dm is determined to be a punctuation signal. That is, the received signal dm is determined to be a punctuation signal when the same phase θ is repeated by 5 symbols or more in succession.

The data demodulation unit 231 compares the phase which is output from the phase conversion unit 227 with the reference phase, and regenerates a modulation signal (baseband signal).

When a punctuation signal is detected from the baseband signal regenerated in the data demodulation unit 231 by the communication data regeneration unit 215, the punctuation signal is removed, and it is identified that a signal immediately before the punctuation signal is a final symbol of frame data, and a signal immediately after the punctuation signal is a head symbol of frame data.

Further, the frame data is converted in a 5B4B conversion by the 5B4B conversion unit 214, and original frame data to be transmitted to the communication line 13a is regenerated. Data after the 5B4B conversion is input to the PHY chip 211 in a 4-bit unit, and is then converted into frame data of the Ethernet (registered trademark) and transmitted through the communication line 13a.

The demodulation unit according to the present invention further includes the phase difference correction unit 230 that absorbs a fluctuation in the reference phase caused by an error between the reference frequency of the modulation clock of the source optical signal and the reference frequency of the local oscillation clock.

The reference phase is set based on a punctuation signal disposed at the head of frame data. However, thereafter, when the error between the reference frequency of the source modulation clock and the reference frequency of the local oscillation clock is accumulated, there is a concern that frame data having a length of up to 1522 bytes cannot be correctly demodulated due to a fluctuation in the reference phase.

The phase difference correction unit 230 is configured to calculate an arithmetic mean value of the symbol phase corresponding to the reference phase which is set in the phase setting unit 229, and correct the relative phase difference between the reference phase and the symbol phase based on the calculated arithmetic mean value.

After the reference phase based on a punctuation signal is set by the phase setting unit 229, the phase difference correction unit 230 calculates an arithmetic mean value of phases of a plurality of symbols in which the symbol value is determined to be 0. When the arithmetic mean value deviates from an allowable range which is set in advance with respect to the reference phase, the phase difference correction unit corrects the arithmetic mean value at that time as a new reference phase.

The allowable range is a value which is appropriately set. For example, when the reference phase having a symbol value of 0 is 30° as in the present embodiment, the allowable range can be set to a range of ±10% of the value.

Referring back to FIG. 5, the bit data communication control unit will be described in detail.

It is set, in accordance with an input of the input and output changeover switch I/O-SW, whether a pair of bit data communication control units 1 and 2 function as an input device that detects an operation state of the switch E-SW for emergency stop from the bit data input unit 240, or function as an output device that outputs an operation state of the switch E-SW for emergency stop from the bit data output unit 340. The bit data communication control units 1 and 2 serve as the first bit data communication control unit 250 when functioning as an input device, and serve as the second bit data communication control unit 350 when functioning as an output device.

In addition, the input value of the rotary switch R-SW is set as an identification code for communication. A pair of bit data communication control units 1 and 2 mutually transfer the input values of the input and output changeover switch I/O-SW and the rotary switch R-SW through the serial communication line SIO and diagnose whether the input values are consistent with each other. When the input values are inconsistent with each other, it is determined to be a failure, and then a failure signal is output or a failure is displayed on the display portion included in the device casing.

As mentioned above, the first bit data communication control unit 250 of the first communication unit 200 performs a failure diagnosis of the input circuits 1 and 2 included in the bit data input unit 240, inputs 2-bit data corresponding to the operation state of the switch E-SW for emergency stop through the input circuits 1 and 2, and transmits a diagnosis result and the bit data to the second communication unit 300 through the first optical communication control unit 220.

The second bit data communication control unit 350 of the second communication unit 300 receives an optical signal transmitted from the first communication unit 200 through the second optical communication control unit 320, and outputs 2-bit data corresponding to the operation state of the switch E-SW for emergency stop through the output circuits 1 and 2 included in the bit data output unit 340.

Figure 9B:
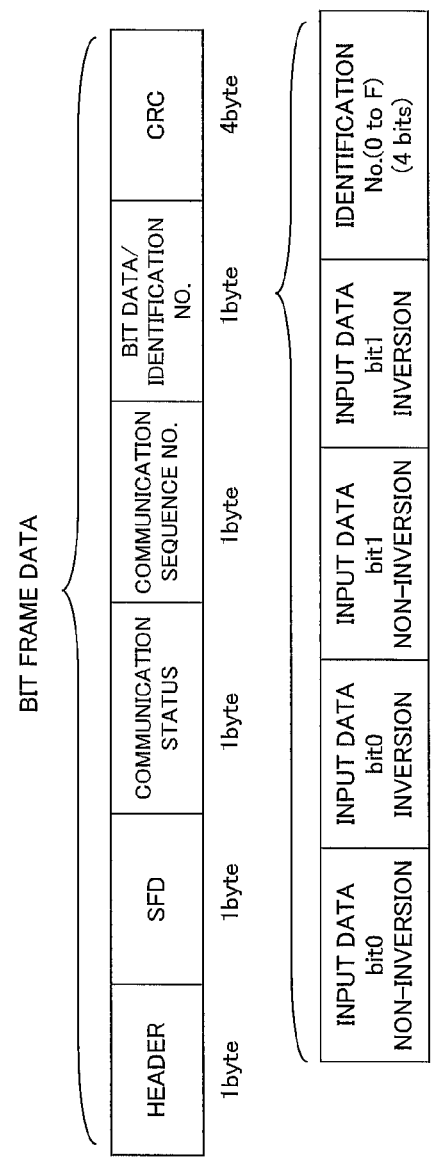

FIG. 9(b) illustrates bit frame data generated by the first bit data communication control unit 250. The bit frame data includes a 1-byte "header" field indicating the head of a frame, a 1-byte "SFD" field, a 1-byte "communication status" field, a 1-byte "communication sequence No." field, a 1-byte "bit data/identification No." field, and a 4-byte "CRC" field.

A 4-bit data region in which 2-bit data which is input from the input circuits 1 and 2 is set in a non-inverted state and an inverted state respectively and a 4-bit identification No. through the above-mentioned rotary switch R-SW are set in the "bit data/identification No." field. It is possible to detect a fluctuation in data due to noise with higher probability by extending 2-bit data to 4-bit data including a non-inverted state and an inverted state.

FIG. 10 illustrates a detailed table of a "communication status". The following status codes are set: "F0h" in a case where the communication state is normal; "E1h" in a case where reception within the reception allowable time Te is not possible; "D2h" in a case where an error such as an error of the CRC code or the communication sequence No. is not detected in received data; "B4h" indicating retransmission for a reception error on the opposite side; "A5h" in a case where a failure of the input circuit is detected in a self-diagnosis; and "96h" in a case where a failure of the output circuit is detected in a self-diagnosis.

The bit frame data is output from one bit data communication control unit 2 (see FIG. 5) through an internal bus to the first optical communication control unit 220, and is stored in a control register of the first optical communication control unit 220.

When bit frame data is stored in the control register, the first optical communication control unit 220 reads out the bit frame data in a 4-bit unit, and outputs the read-out bit frame data to the 4B5B conversion unit 212 illustrated in FIG. 6. Thereafter, the modulation process similar to the transmission of the wired-line data previously described in FIG. 6(a) is executed, and an optical signal corresponding to the bit frame data is transmitted toward the second communication unit 300.

When an optical signal corresponding to the bit frame data transmitted from the first communication unit 200 is received, the second optical communication control unit 320 of the second communication unit 300 executes the demodulation process similar to the reception of the wired-line data previously described in FIG. 8(a), and stores the received bit frame data in the control register.

Meanwhile, the second optical communication control unit 320 receives both the frame data which is input from the communication line 13a which is a wired line and the above-mentioned bit frame data, and identifies the frame data and the bit frame data based on the difference between SFD (=10101011B) of the frame data and the header (=11001100B) of the bit frame data and the difference that the frame data is 64 bytes at a minimum, whereas the data length of the bit frame data is 9 bytes.

The second bit data communication control unit 350 of the second communication unit 300 reads out bit frame data received in the second optical communication control unit 320 and stored in the control register through the internal bus, and outputs bit data contained in the bit frame data from the output circuits 1 and 2 when it is determined to be bit frame data normally received.

Similarly to the first bit data communication control unit 250, the second bit data communication control unit 350 also generates bit frame data for transmission toward the first communication unit 200, and generates and writes the bit frame data for transmission in the control register of the second optical communication control unit 320 through the internal bus, to thereby transmit the bit frame data from the second optical communication control unit 320 to the first communication unit 200.

The bit frame data generated in the second bit data communication control unit 350 is the same as the bit frame data described in FIG. 9(b), except that the data which is set in the input data region of the "bit data/identification No." field is data which is output to the output circuits 1 and 2.

Hereinafter, reference will be made to FIGS. 11 and 12 to describe a transmission and reception sequence of bit frame data performed between the first bit data communication control unit 250 and the second bit data communication control unit 350 through the first optical communication control unit 220 and the second optical communication control unit 320.

Figure 11:
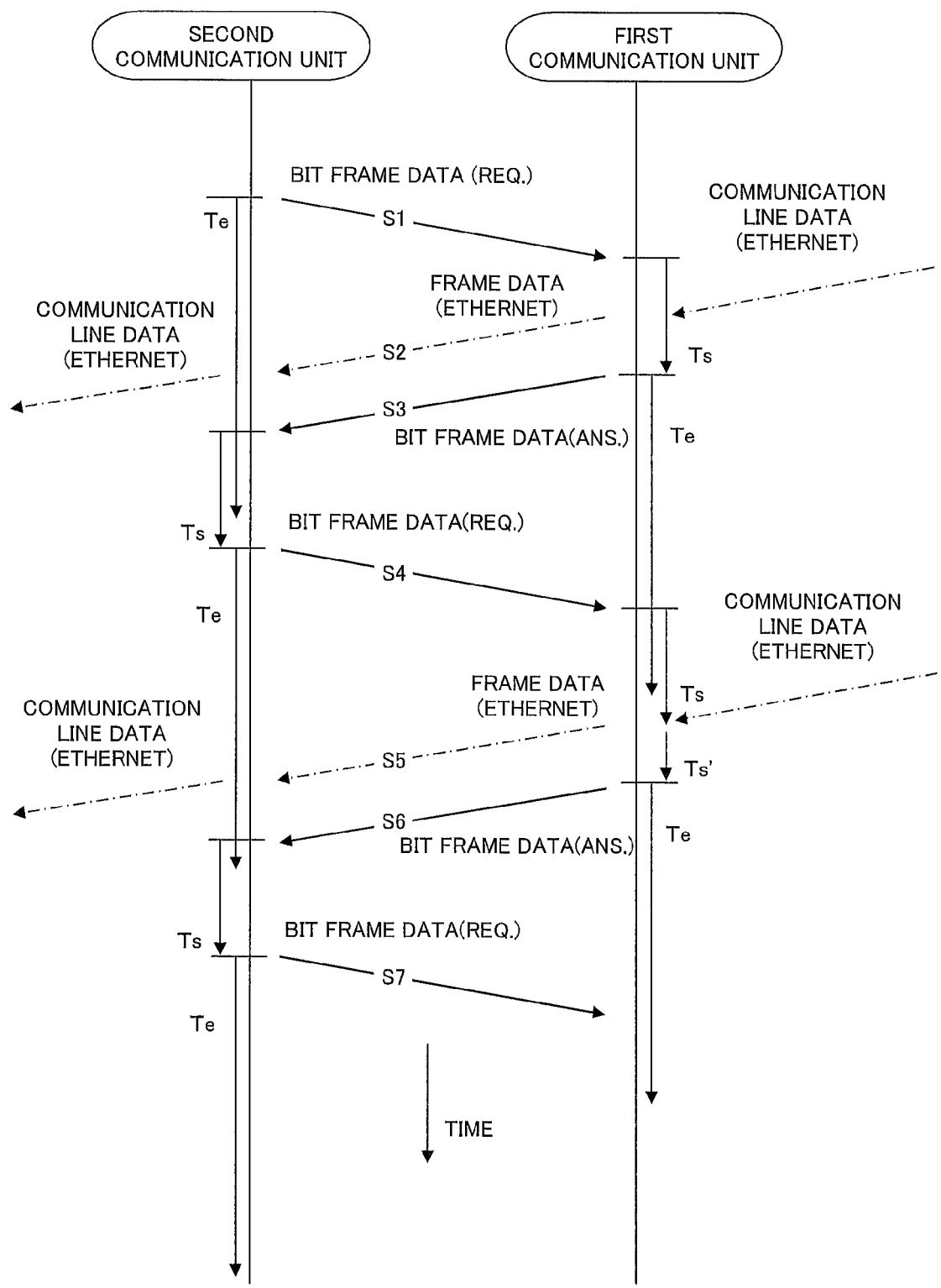
FIG. 11 is a timing diagram illustrating an optical signal transmitted and received by the optical communication control unit.

As illustrated in FIG. 11, when power is supplied to the automatic conveyance device and the optical data transmission device starts up, the second bit data communication control unit 350 of the second communication unit 300 generates bit frame data (REQ) serving as a transmission request to the first bit data communication control unit 250, writes the bit frame data (REQ) in the control register of the second optical communication control unit 320, optically transmits the bit frame data (REQ) through the second optical communication control unit 320, and sets a response waiting timer Te for a response from the first communication unit 200 (S1). When there is no response from the first communication unit 200 until the response waiting timer Te counts up, it is determined that an opportunity of the response is missed by some trouble.

The first bit data communication control unit 250 of the first communication unit 200 starts up a timer Ts as a transmission interval of bit frame data when the bit frame data (REQ) is received, generates bit frame data (ANS) serving as a response to the second bit data communication control unit 350 when the timer Ts counts up, writes the bit frame data (ANS) in the control register of the first optical communication control unit 220, optically transmits the bit frame data (ANS) through the first optical communication control unit 220, and sets the response waiting timer Te for a response from the second communication unit 300 (S3).

In such a procedure, the bit frame data is transferred between the first communication unit 200 and the second communication unit 300 (S1, S3, S4, S6, and S7). Meanwhile, instead of the first bit data communication control unit 250 and the second bit data communication unit 350, the first optical communication control unit 220 and the second optical communication control unit 320 may be configured to manage the setting and count-up of the transmission interval timer Ts and the response waiting timer Te.

When wired-line data is input from the wired line until the bit frame data (ANS) is written in the control register, the first optical communication control unit 220 of the first communication unit 200 optically transmits frame data (Ethernet (registered trademark)) corresponding to the wired-line data to the second communication unit (S2).

In a case where the first optical communication control unit 220 of the first communication unit 200 is optically transmitting frame data (Ethernet (registered trademark)) corresponding to the wired-line data to the second communication unit (S5) when the bit frame data (ANS) is written in the control register, the first optical communication control unit 220 optically transmits the bit frame data (ANS) to the second communication unit (S6) when a predetermined time Ts' elapses after the transmission of the frame data (Ethernet (registered trademark)) is terminated.

As described in FIG. 9(a), the frame data of the Ethernet (registered trademark) has an idle time of 96-bit time, and preamble is contained in the head of the frame. As previously described, the first optical communication control unit 220 is configured to optically transmit the frame data of the Ethernet (registered trademark) except for preamble. Therefore, the bit frame data (ANS) may be optically transmitted within the total time of the idle time of 96-bit time and the 56-bit time of preamble. The predetermined time Ts' is set to a value shorter than this total time.

In addition, the value of the timer Ts serving as the transmission interval of bit frame data is set to be several tens of msec. (10 to 30 msec.) sufficiently longer than appropriately 1 msec. which is the longest period of the frame data of the Ethernet (registered trademark).

Meanwhile, in FIG. 11, although the sequence in which the wired-line data is input from the wired line has been described taking the first optical communication control unit 220 as an example, the same is true that the wired-line data is input from the wired line to the second optical communication control unit 320.

That is, the first bit data communication control unit 250 generates predetermined bit frame data including bit data which is input to the bit data input unit 240 to output the generated bit frame data to the first optical communication control unit 220, and causes the first optical communication control unit 220 to transmit an optical signal, in which an optical carrier wave is modulated based on the bit frame data, toward the second communication unit 300 at a predetermined interval Ts, and at time of non-transmission of the optical signal based on the frame data for optical communication (Ethernet (registered trademark)).

The first bit data communication control unit 250 generates the above-mentioned predetermined bit frame data (ANS), in response to the transmission request which is bit frame data (REQ) first transmitted from the second bit data communication control unit 350, to output the generated bit frame data to the first optical communication control unit 220, and causes the first optical communication control unit 220 to transmit an optical signal in which an optical carrier wave is modulated based on the bit frame data to the second communication unit 300. Thereby, after that, communication is mutually repeated.

Further, the second bit data communication control unit 350 is set so that predetermined default data, preferably, data for stopping an operation is output from the output circuits 1 and 2 of the bit data output unit until the bit frame data is received from the first bit data communication control unit 250 for the first transmission of the bit frame data (REQ).

When proper bit frame data is received from the first bit data communication control unit 250, the second bit data communication control unit 350 outputs a signal having a level according to bit data contained in the bit frame data from the output circuits 1 and 2.

As mentioned above, communication is performed between the second bit data communication control unit 350 of the second communication unit 300 and the first bit data communication control unit 250 of the first communication unit 200, in terms of a set of bit frame data of the bit frame data (REQ) which is a response request from the second bit data communication control unit 350 and the bit frame data (ANS) which is a response from the first bit data communication control unit 250.

Meanwhile, in the above-mentioned example, although an aspect has been described in which the second communication unit 300 side optically transmits the bit frame data (REQ) serving as a transmission request to the first communication unit 200 side, the example is not necessarily limited to such an aspect, but the first communication unit 200 side may first optically transmit the bit frame data (REQ) serving as a transmission request to the second communication unit 300 side.

The communication unit of the bit frame data is managed by the communication sequence No. (simply, also written as "sequence No." or "SNo.") described in FIG. 9(*b*), the sequence No. is updated when transmission and reception are normally completed in a set of communication units, and the sequence No. is maintained until transmission and reception are normally completed when a communication error is generated in the middle of communication.

Figure 12:
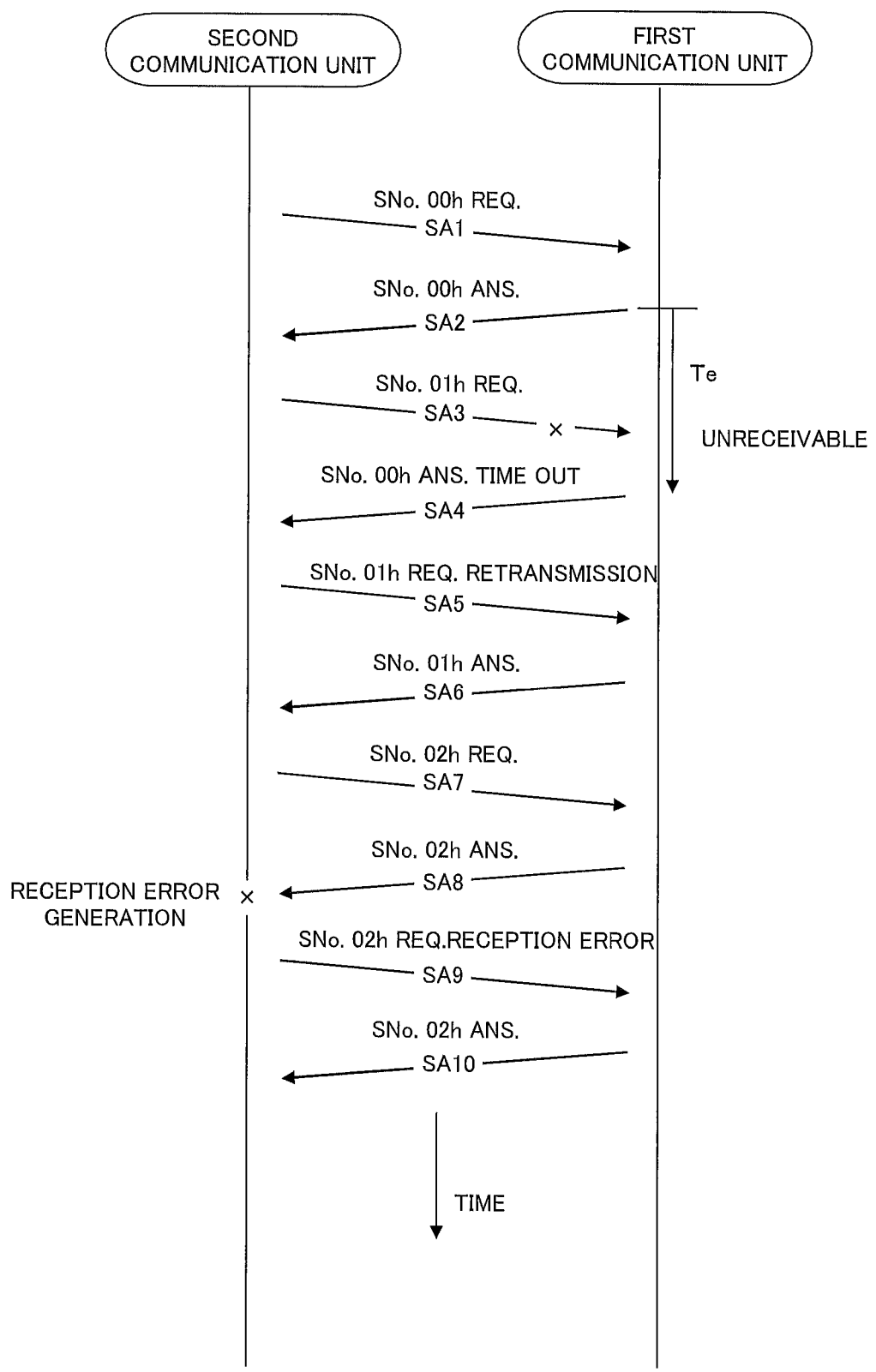
FIG. 12 is a diagram illustrating a transmission and reception procedure of the bit frame data transmitted and received through the optical communication control unit.

As illustrated in FIG. 12, initially, the bit frame data (REQ) of sequence No. "00h" is transmitted from the second bit data communication control unit 350, and the bit frame data (ANS) of sequence No. "00h" is returned from the first bit data communication control unit 250 (SA1 and SA2).

After step SA2, when it is detected that the response waiting timer Te counts up, the first bit data communication control unit 250 determines that new bit frame data (REQ) of step SA3 cannot be received, and returns the bit frame data (ANS) of sequence No. "00h" (SA4). At this time, the communication status illustrated in FIGS. 9(*b*) and 10 is set to "E1h" indicating a time-out error. Meanwhile, the communication status is set to "F0h" when being in a normal state.

The second bit data communication control unit 350 receiving the bit frame data (ANS) of sequence No. "00h" retransmits the bit frame data (REQ) of sequence No. "01h" (SA5). At this time, the communication status is set to "B4h" indicating a retransmission process.

The first bit data communication control unit 250 receiving the bit frame data (REQ) of sequence No. "01h" retransmitted in step SA5 returns the bit frame data (ANS) of sequence No. "01h" (SA6). The second bit data communication control unit 350 receiving the bit frame data (ANS) updates the sequence No., and transmits the bit frame data (REQ) of sequence No. "02h" (SA7).

When a reception error for the bit frame data (ANS) (SA8) of sequence No. "02h" returned from the first bit data communication control unit 250 is generated in the second bit data communication control unit 350, the second bit data communication control unit 350 retransmits the bit frame data (REQ) of sequence No. "02h" (SA9). The communication status at this time is set to "D2h" indicating a reception error.

When the bit frame data (REQ) is received, the first bit data communication control unit 250 retransmits the bit frame data (ANS) of sequence No. "02h" (SA10). The communication status at this time is set to "B4h" indicating a retransmission process for a reception error on the opposite side.

In this manner, the communication status and the communication sequence No. are set so that the state of the received bit frame data can be perceived, and a proper response can be made.

Further, the identification code which is set in the identification code setting unit (rotary switch R-SW) is set in the identification No. of the "bit data/identification No." field described in FIG. 9(*b*). In the present embodiment, the same value is set in the first bit data communication control unit 250 and the second bit data communication control unit 350.

When the identification code contained in the received bit frame data is consistent with the identification code which is set in the identification code setting unit, the first bit data communication control unit 250 and the second bit data communication control unit 350 determine that the bit frame data is effective. Meanwhile, all the identification codes which are set in the first bit data communication control unit 250 and the second bit data communication control unit 350 are not required to be the same value, but may be in at least a constant relationship.

For example, it may be configured such that the identification code is set in the first bit data communication control unit 250 to which the bit data is input when the rotary switch R-SW is set to even-numbered values including 0, and the identification code is set in the second bit data communication control unit 350 from which the bit data is output when the rotary switch R-SW is set to odd-numbered values. In this case, when the identification codes on the opposite communication side which correspond to the set identification codes are specified in advance, the identification codes can be mutually checked, and when the received identification codes are different from the identification codes specified in advance, it can be determined to be a communication error. As an example of a pair of identification codes, a combination of (0-1), (2-3), (4-5), (6-7), (8-9), (A-B), (C-D), (E-F), and the like is possible in hexadecimal representation.

The setting of the identification code is to avoid a concern of malfunction in a case where the bit frame data which is output from another optical data transmission device is erroneously received, such as a case where a plurality of stacker cranes are disposed on the same track so as to be capable of traveling.

Therefore, the relationship between the identification codes which are set between the first transmission unit 200 and the second transmission unit 300 constituting a series of optical data transmission devices transmitting the operation state of a switch E-SE for emergency stop is required to be unique. In the example illustrated in FIG. 3, both the optical data transmission device 100 between the system control device 13 and the servo control units 30*b* and 32*b* and the optical data transmission device 100 between the servo control units 30*b* and 32*b* and the servo control unit 42*b* are configured such that the identification codes having unique relationships are set.

In addition, as illustrated in FIG. 5, when the first communication unit 200 and the second communication unit 300 are constituted by common circuits, an output terminal of the bit data output unit 340 included in the second communication unit 300 and an input terminal of the bit data input unit 240 of the first communication unit 200 installed on the subsequent stage thereof are connected to each other. Using such a connection, the operation state of the switch E-SE for emergency stop installed on the fixed equipment can be optically transmitted through multiple stages of the optical data transmission devices.

The status codes corresponding to an input circuit failure and an output circuit failure which are set in the communication status of the bit frame data are status codes indicating failures of the input circuits 1 and 2 and failures of the output circuits 1 and 2 detected in a self-diagnosis process using the diagnostic circuit which is executed in the above-mentioned bit data communication control units 1 and 2 (see FIG. 5).

When the second bit data communication control unit 350 determines that the input circuit is abnormal based on the status code contained in the bit frame data received in the second optical communication control unit 320, the communication control unit 350 forcibly switches the output state of bit data which is output from the bit data output unit 340 to predetermined data, preferably, data for stopping an operation.

Although previously described in FIG. 5, the first bit data communication control unit 250 and the second bit data communication control unit 350 include two bit data communication control units 1 and 2, respectively, and the bit data communication control units 1 and 2 are connected to each other through the serial communication line SIO.

The communication sequence of the bit frame data and the bit frame data are also redundantly checked by the bit data communication control units 1 and 2 redundantly installed.

The bit frame data demodulated in the first or second optical communication control units 220 or 320 and stored in the control register is loaded into one bit data communication control unit 2 (see FIG. 5) through the internal bus, and is transmitted to the other bit data communication control unit 1 through the serial communication line SIO.

Both the bit data communication control units 1 and 2 determine a reception time-out error when the response waiting timer Te counts up, and stores error information in the registers included in the bit data communication control units 1 and 2.

Both the bit data communication control units 1 and 2 check the identification Nos. of the bit frame data, discard the bit frame data when determining that they are inconsistent with each other, and store error information in the registers included in the bit data communication control units 1 and 2.

Both the bit data communication control units 1 and 2 determine that a reception error is generated based on the communication sequence No. of the bit frame data and CRC, and store error information in the registers included in the bit data communication control units 1 and 2 when determining that a reception error is generated.

When it is determined that a reception error is not generated, both the bit data communication control units 1 and 2 determine the current communication state based on the communication status of the bit frame data and the communication sequence No., and generate bit frame data, as necessary, in which the communication status, the communication sequence No., and the bit data are updated.

The bit data communication control unit 1 transmits the error information stored in the register and the bit frame data after the update to the bit data communication control unit 2 through the serial communication line SIO. The bit data communication control unit 2 compares the error information transmitted from the bit data communication control unit 1 with the bit frame data after the update and its own error information with the bit frame data after the update, determines that a process is correctly performed when they are consistent with each other, and stores the bit frame data after the update in the control registers of the first or second optical communication control units 220 or 320 through the internal bus.

In this manner, in the first communication unit 200 and the second communication unit 300, the input and output process of the bit data and the optical communication processing block of the bit frame data including the bit data are redundantly configured, and it is determined that a process is properly performed when both the processing results are consistent with each other. Therefore, it is possible to realize an optical data transmission device corresponding to the functional safety standard (IEC61508) required for such a signal having a high degree of importance as an emergency stop switch signal.

Meanwhile, the number of redundancies of each processing block is not limited to 2, but may be set to equal to or greater than 3. In that case, it is also possible to determine that a process is proper by adopting a principle of majority rule, except that it is determined that a process is proper when all are consistent with each other. In addition, it is also possible to simplify redundancy in accordance with the level of a required functional safety standard.

Hereinafter, a separate embodiment will be described.

Although an example has been described in which an operation state signal from a switch for emergency stop for stopping the entire system is input to the bit data input unit 240 as bit data, the signal which is input to the bit data input unit 240 may be other signals. For example, an operation state signal of a switch for stopping a specific function such as stopping a specific servo motor may be used.

In the descriptions of steps S5 and S6 of FIG. 11, although an example has been described in which when the bit frame data (ANS) is written in the control register during optical transmission of the frame data (Ethernet (registered trademark)) corresponding to the wired-line data to the second communication unit, the first optical communication control unit 220 of the first communication unit 200 optically transmits the bit frame data (ANS) to the second communication unit when the predetermined time Ts' elapses after the transmission of the frame data is terminated, the bit frame data (ANS) may be optically transmitted to the second communication unit without waiting for the elapse of the predetermined time Ts'.

As described in FIGS. 6(*a*) and 8(*a*), a punctuation signal having the same data of 5 symbols or more is inserted between a series of frame data by the modulation signal generation unit 213. Therefore, even when the bit frame data (ANS) is optically transmitted to the second communication unit immediately after the transmission termination of the frame data, the frame data and the bit frame data can be identified.

As illustrated in FIG. 5, when the first communication unit 200 and the second communication unit 300 are constituted by common circuits, it may be configured such that predetermined switches are respectively connected to both the bit data input unit, and the bit data can be transmitted and received in the bi-direction. For example, it is also possible to connect a switch for emergency stop to the first communication unit 200 side, and to connect a confirmation switch for confirming a release of the emergency stop state to the second communication unit 300 side.

When the switch for emergency stop is operated, bit data for emergency stop is transmitted from the first communication unit 200 to the second communication unit 300, and the system is brought to an emergency stop. Thereafter, when the switch for emergency stop is operated to be returned, and bit data for a return from the first communication unit 200 to the second communication unit 300 is transmitted, it can be configured such that the system is returned on the condition that bit data corresponding to an operation of the confirmation switch is transmitted from the second communication unit 300 to the first communication unit 200, without being immediately returned.

In this case, the first communication unit 200 and the second communication unit 300 can also transmit and receive the bit data in the above-mentioned procedure. When bi-directional communication is performed on the bit data, the input and output changeover switch I/O-SW described in FIG. 5 may be caused to function as a master/slave changeover switch.

It can be configured such that the first communication unit 200 to which the switch for emergency stop is input is set in the master side, the second communication unit 300 to which the confirmation switch is input is set in the slave side, and after a supply of power to the system, the first communication unit 200 side first optically transmits the bit frame data (REQ) serving as a transmission request to the second communication unit 300 side.

The wired-line data which is relayed by the optical data transmission device to the present invention through the wired line according is not limited to the communication line of the Ethernet (registered trademark), but can be applied to a relay of the wired-line data through any wired line.

The automatic conveyance device according to the present invention is not limited to the stacker crane, but can be applied to an automatic conveyance device including mobile equipment that moves on a predetermined track and fixed equipment that controls the mobile equipment, the automatic conveyance device that performs communication between the mobile equipment and the fixed equipment through the above-mentioned optical data transmission device.

For example, the automatic conveyance device is also suitably used for communication between the mobile equipment serving as an overhead crane installed on a steel mill and the like and the fixed equipment including a control device that controls the overhead crane.

The specific configuration of the optical data transmission device described above is illustrative of an example of the present invention. It goes without saying that the present invention is not limited to the disclosure, but design changes of the specific configuration of each block can be made appropriately within the scope of the operations and effects of the present invention.

DESCRIPTION OF SYMBOLS

13: fixed equipment (system control device)
13a: wired line (communication line)
18: guide rail
20: stacker crane
21: mobile equipment (traveling carriage)
25: mobile equipment (elevating platform)
30a: servo motor
30b: servo control unit
32a: servo motor
32b: servo control unit
42a: servo motor
42b: servo control unit
100: optical data transmission device
200: first communication unit
210: first data conversion unit
220: first optical communication control unit
232, 233: input circuit
234, 235: diagnostic circuit
240: bit data input unit
250: first bit data communication control unit (bit data communication control units 1 and 2)
260: light-transmitting unit
270: light-receiving unit
300: second communication unit
310: second data conversion unit
320: second optical communication control unit
321, 322: output circuit
323, 324: diagnostic circuit
340: bit data output unit
350: second bit data communication control unit (bit data communication control units 1 and 2)
360: light-transmitting unit
370: light-receiving unit

The invention claimed is:

1. An optical data transmission device comprising a first communication unit and a second communication unit which are disposed movably relative to each other, wherein the first communication unit includes a first data conversion unit that converts first wired-line data which is input from a first wired line into first wired-line frame data for optical communication to output the converted frame data to a first optical communication control unit, and inversely converts second wired-line frame data which is input from the first optical communication control unit into second wired-line data to output the inversely-converted data to the first wired line, the first optical communication control unit that transmits a first optical signal, optically modulated based on the first wired-line frame data which is input from the first data conversion unit, toward the second communication unit, and demodulates the second wired-line frame data from a second optical signal transmitted from the second communication unit to output the demodulated frame data to the first data conversion unit, a bit data input unit including an input circuit that inputs bit data from a signal line different from the first wired line, a first bit data communication control unit that generates predetermined bit frame data including bit data which is input to the bit data input unit to output the generated bit frame data to the first optical communication control unit, and causes the first optical communication control unit to transmit a third optical signal, optically modulated based on the bit frame data, toward the second communication unit at a predetermined interval different from that of the first wired-line frame data, and the second communication unit includes a second data conversion unit that converts the second wired-line data which is input from a second wired line into the second wired-line frame data to output the converted frame data to a second optical communication control unit, and inversely converts the first wired-line frame data which is input from the second optical communication control unit into the first wired-line data to output the inversely-converted data to the second wired line, the second optical communication control unit that transmits the second optical signal, optically modulated based on the second wired-line frame data which is input from the second data conversion unit, toward the first communication unit, and demodulates the first wired-line frame data from the first optical signal transmitted from the first communication unit to output the demodulated frame data to the second data conversion unit, a second bit data communication control unit that causes the second optical communication control unit to demodulate the bit frame data from the third optical signal transmitted from the first communication unit, and a bit data output unit including an output circuit that outputs bit data contained in the bit frame data demodulated in the second optical communication control unit from a signal line different from the second wired line.

2. The optical data transmission device according to claim 1, wherein the first bit data communication control unit transmits the third optical signal optically modulated based on the bit frame data toward the second communication unit through the first optical communication control unit, and then detects that there is a response from the second communication unit within a predetermined response waiting time.

3. The optical data transmission device according to claim 1, wherein the first bit data communication control unit causes the first optical communication control unit to transmit the third optical signal optically modulated based on the bit frame data toward the second communication unit, at the time of non-transmission of the first optical signal based on the first wired-line frame data.

4. The optical data transmission device according to claim 1, wherein the first bit data communication control unit includes a first identification code setting unit that sets a predetermined identification code and the second bit data communication control unit includes a second identification code setting unit that sets a predetermined identification code,
the first bit data communication control unit outputs the bit frame data into which the first identification code set in the first identification code setting unit is incorporated to the first optical communication control unit, and
the second bit data communication control unit compares the first identification code contained in the bit frame data received in the second optical communication control unit with a second identification code set in the second identification code setting unit, and determines that the bit frame data is effective when both the first and second identification codes have a predetermined relationship.

5. The optical data transmission device according to claim 1, wherein predetermined default data is set so as to be output from the bit data output unit until communication of the bit frame data between the first bit data communication control unit and the second bit data communication control unit is established after a supply of power to a device.

6. An optical communication device which is incorporated into the optical data transmission device according to claim 1, comprising:
the first data conversion unit, the first optical communication control unit, the bit data input unit, and the first bit data communication control unit.

7. An optical communication device which is incorporated into the optical data transmission device according to claim 1, comprising:
the second data conversion unit, the second optical communication control unit, the bit data output unit, and the second bit data communication control unit.

8. An automatic conveyance device comprising:
mobile equipment that moves on a predetermined track; and
fixed equipment that controls the mobile equipment,
wherein communication between the mobile equipment and the fixed equipment is performed through the optical data transmission device according to claim 1.

9. An automatic conveyance device comprising:
mobile equipment that moves on a predetermined track; and
fixed equipment that controls the mobile equipment,
wherein communication between the mobile equipment and the fixed equipment is performed through the optical data transmission device according to claim 1, and bit data indicating an operation state of an emergency stop switch is input to the bit data input unit, and transitions to a predetermined safety state based on an emergency stop signal which is output from the bit data output unit.

10. An optical data transmission device comprising a first communication unit and a second communication unit which are disposed movably relative to each other,
the first communication unit includes
a first data conversion unit that converts first wired-line data which is input from a first wired line into first wired-line frame data for optical communication to output the converted frame data to a first optical communication control unit, and inversely converts second wired-line frame data which is input from the first optical communication control unit into second wired-line data to output the inversely-converted data to the first wired line,
the first optical communication control unit that transmits a first optical signal, optically modulated based on the first wired-line frame data which is input from the first data conversion unit, toward the second communication unit, and demodulates the second wired-line frame data from a second optical signal transmitted from the second communication unit to output the demodulated frame data to the first data conversion unit,
a bit data input unit in which an input circuit that inputs bit data from a signal line different from the first wired line is redundantly installed,
a first bit data communication control unit that generates bit frame data, including bit data input to the bit data input unit, into which a status code indicating a normal state is incorporated to output the generated bit frame data to the first optical communication control unit when it is determined that bit data which is input to the input circuit is consistent with each other, and causes the first optical communication control unit to transmit a third optical signal optically modulated based on the bit frame data toward the second communication unit, and
the second communication unit includes
a second data conversion unit that converts second wired-line data which is input from a second wired line into the second wired-line frame data to output the converted frame data to a second optical communication control unit, and inversely converts the first wired-line frame data which is input from the second optical communication control unit into first wired-line data to output the inversely-converted data to the second wired line,
the second optical communication control unit that transmits the second optical signal, optically modulated based on the second wired-line frame data which is input from the second data conversion unit, toward the first communication unit, and demodulates the first wired-line frame data from the first optical signal transmitted from the first communication unit to output the demodulated frame data to the second data conversion unit,
a second bit data communication control unit that causes the second optical communication control unit to demodulate the bit frame data from the third optical signal transmitted from the first communication unit, and
a bit data output unit including an output circuit that outputs bit data contained in the bit frame data demodulated in the second optical communication control unit from a signal line different from the second wired line.

11. The optical data transmission device according to claim 10, wherein the bit data input unit includes a diagnostic circuit that diagnoses whether each input circuit is normally operated for each input circuit, and the first bit data communication control unit controls each diagnostic circuit to diagnose each input circuit, generates, when each input circuit is determined to be normal, bit frame data, including bit data input to the bit data input unit, into which a status code indicating the normal state is incorporated to output the generated bit frame data to the first optical communication control unit, and causes the first optical communication control unit to transmit the third optical signal optically modulated based on the bit frame data toward the second communication unit.

12. The optical data transmission device according to claim 11, wherein when the first bit data communication control unit that controls the diagnostic circuit to diagnose the input circuit is further redundantly installed, the first bit data communication control units are connected to each other through a communication line, and at least one of the first bit data communication control units controls each diagnostic circuit to diagnose each input circuit, another first bit data communication control unit is also configured to diagnose each input circuit at the same time, and at least one of the first bit data communication control units outputs the bit frame data, into which a status code indicating a normal state is incorporated, to the first optical communication control unit when all the diagnosis result are determined to be normal.

13. The optical data transmission device according to claim 10, wherein the first bit data communication control unit causes the first optical communication control unit to transmit the third optical signal optically modulated based on the bit frame data toward the second communication unit, at the time of non-transmission of the first optical signal based on the first wired-line frame data.

14. The optical data transmission device according to claim 10, wherein the first bit data communication control unit includes a first identification code setting unit that sets a predetermined identification code and the second bit data communication control unit includes a second identification code setting unit that sets a predetermined identification code, the first bit data communication control unit outputs the bit frame data into which a first identification code set in the first identification code setting unit is incorporated to the first optical communication control unit, and the second bit data communication control unit compares the first identification code contained in the bit frame data received in the second optical communication control unit with a second identification code set in the second identification code setting unit, and determines that the bit frame data is effective when both the first and second identification codes have a predetermined relationship.

15. The optical data transmission device according to claim 10, wherein predetermined default data is set so as to be output from the bit data output unit until communication of the bit frame data between the first bit data communication control unit and the second bit data communication control unit is established after a supply of power to a device.

* * * * *